Oct. 11, 1966  E. C. JOHNSON ETAL  3,278,817
CONTROL SYSTEM FOR MACHINE TOOL
Original Filed Aug. 1, 1955  18 Sheets-Sheet 3

INVENTORS
E. CALVIN JOHNSON
AVREL MASON
CHARLES A. PIPER
CHIEN-BOR SUNG
BY
ATTORNEY

Oct. 11, 1966  E. C. JOHNSON ETAL  3,278,817
CONTROL SYSTEM FOR MACHINE TOOL
Original Filed Aug. 1, 1955  18 Sheets-Sheet 4

INVENTORS
E. CALVIN JOHNSON
AVREL MASON
CHARLES A. PIPER
CHIEN-BOR SUNG
BY
Vett Parsigian
ATTORNEY Oct. 11, 1966  E. C. JOHNSON ETAL  3,278,817
CONTROL SYSTEM FOR MACHINE TOOL
Original Filed Aug. 1, 1955  18 Sheets-Sheet 6

INVENTORS
E. CALVIN JOHNSON
AVREL MASON
CHARLES A. PIPER
CHIEN-BOR SUNG
BY
Vett Parsigian
ATTORNEY Oct. 11, 1966 E. C. JOHNSON ETAL 3,278,817
CONTROL SYSTEM FOR MACHINE TOOL
Original Filed Aug. 1, 1955 18 Sheets-Sheet 7

INVENTORS
E. CALVIN JOHNSON
AVREL MASON
CHARLES A. PIPER
CHIEN-BOR SUNG
BY
ATTORNEY

FIG 12

Oct. 11, 1966   E. C. JOHNSON ETAL   3,278,817
CONTROL SYSTEM FOR MACHINE TOOL
Original Filed Aug. 1, 1955   18 Sheets-Sheet 14

INVENTORS
E. CALVIN JOHNSON
AVREL MASON
CHARLES A. PIPER
CHIEN-BOR SUNG
BY
*Vett Parsigian*
ATTORNEY INVENTORS
E. CALVIN JOHNSON
AVREL MASON
CHARLES A. PIPER
CHIEN-BOR SUNG
BY
ATTORNEY INVENTORS
E. CALVIN JOHNSON
AVREL MASON
CHARLES A. PIPER
CHIEN-BOR SUNG
BY
ATTORNEY

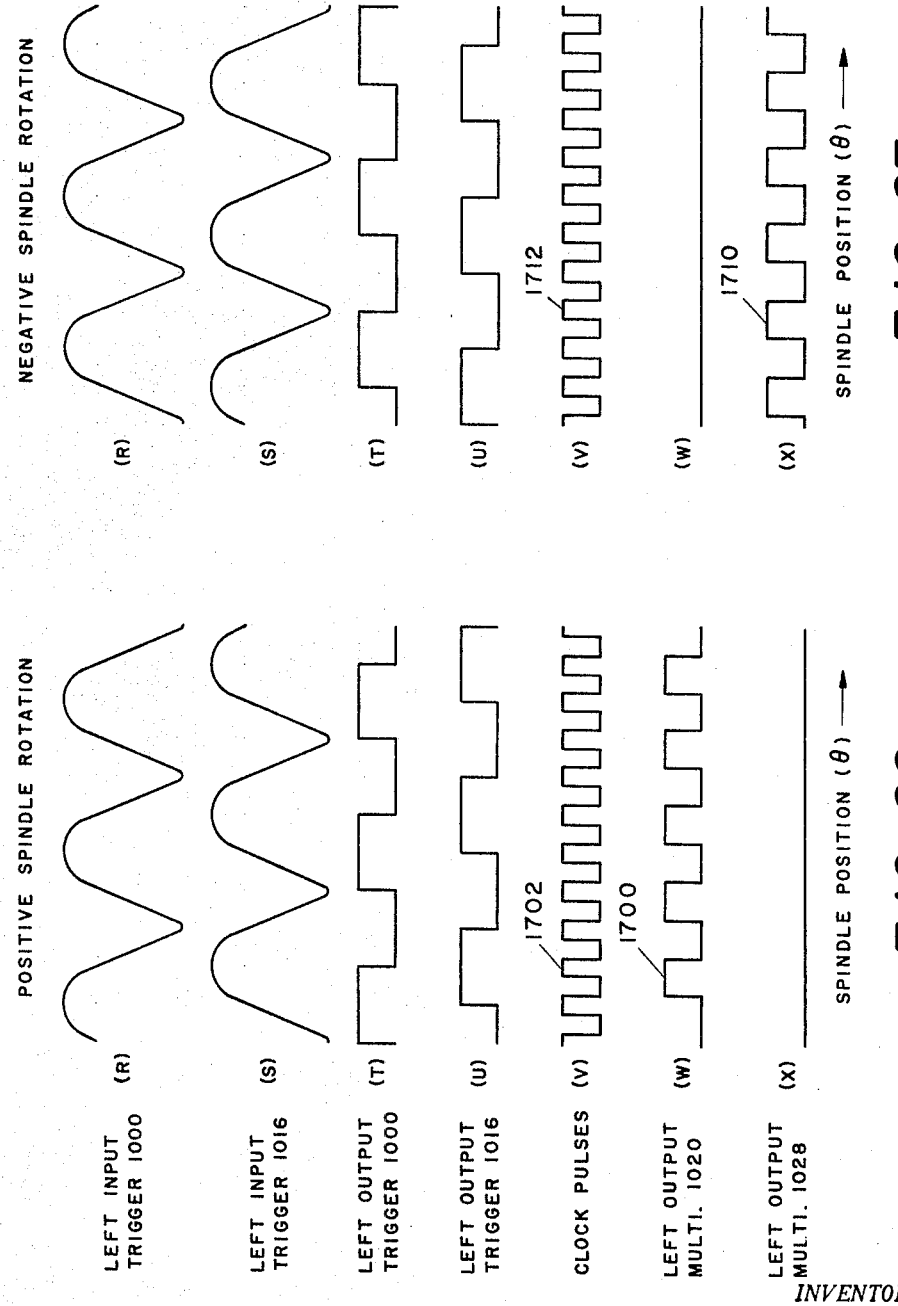

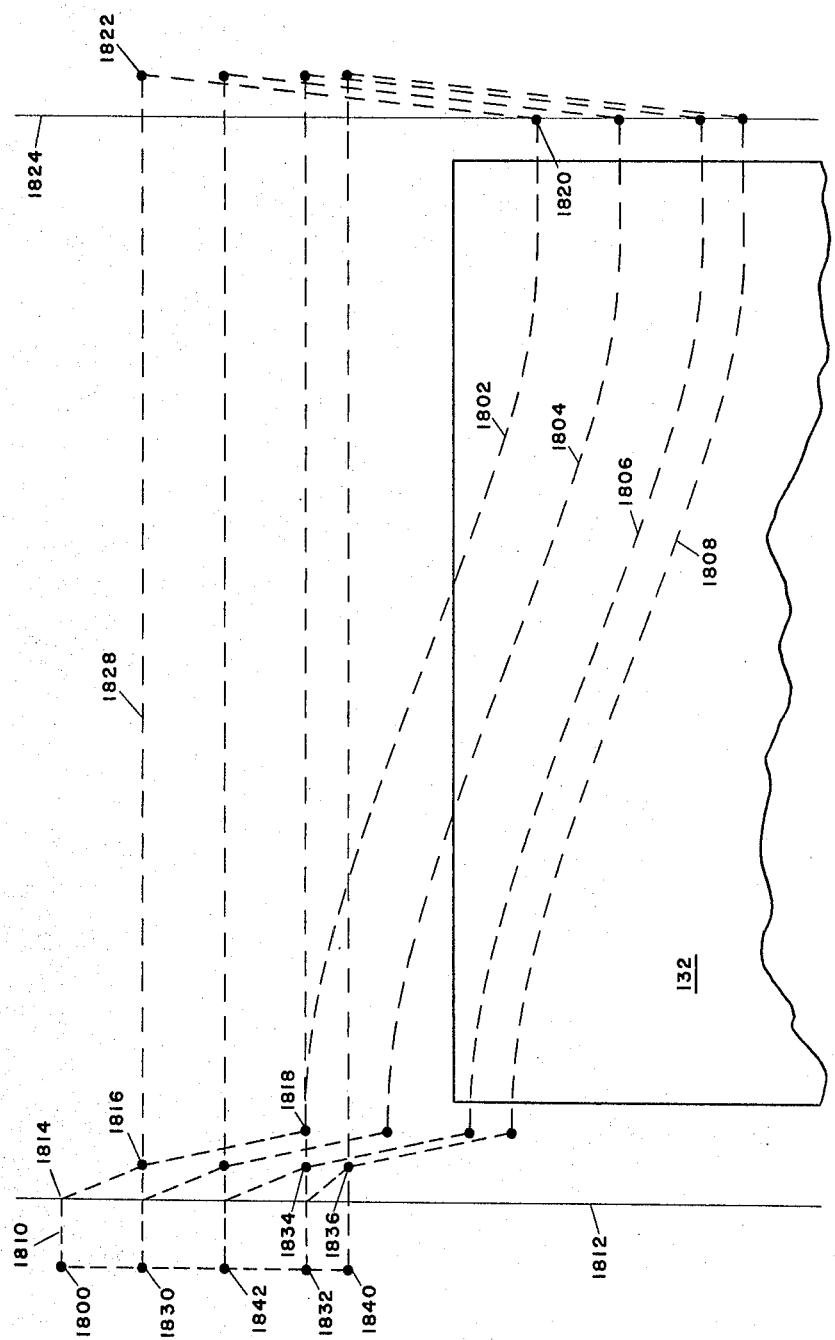

United States Patent Office 3,278,817
Patented Oct. 11, 1966

3,278,817
CONTROL SYSTEM FOR MACHINE TOOL
Ewell Calvin Johnson, Royal Oak, Mich., Avrel Mason, Moorestown, N.J., and Charles A. Piper, Detroit, and Chien-Bor Sung, Oak Park, Mich., assignors to The Bendix Corporation, a corporation of Delaware
Continuation of application Ser. No. 525,524, Aug. 1, 1955. This application July 31, 1958, Ser. No. 752,686
24 Claims. (Cl. 318—18)

This application is a continuation of co-pending application Ser. No. 525,524, filed Aug. 1, 1955 by Ewell Calvin Johnson, Avrel Mason, Charles A. Piper and Chien-Bor Sung, and now abandoned.

This invention relates to a machine tool and more particularly to an automatically controlled machine tool.

At present a considerable amount of time and expense is involved in producing cams having close tolerance requirements. The main reason for this is that most of the work on such cams must be done by hand. For example, it may require up to four months for a skilled workman to make a single high precision cam having a three dimensional configuration.

This invention provides a machine tool which operates automatically to cut cams in accordance with the dictates of recorded information fed to the machine. The machine includes a spindle for rotating a workpiece and a tool movable in an axial and radial direction relative to the workpiece. The tool movement in the axial and radial directions is synchronized with the spindle rotation to cut a three dimensional cam having the desired contour.

The movement of the tool in the axial direction is controlled by the spindle because of a geared relationship and the movement of the tool in the radial direction is controlled in accordance with recorded information in numerical form which is fed to the machine tool. This information is utilized to provide a particular number of electrical pulses representative of the numerical information for driving the tool in the radial direction a distance proportional to the number of electrical pulses.

From recorded information, such as may be provided on a tape, the machine tool can cut high precision cams in relatively short periods of time. For example, it has been found that most cams can be cut in less than four hours.

An object of this invention is to provide an automatically controlled machine tool.

Another object of this invention is to provide a machine tool for receiving recorded information and for utilizing the information to control the operation of the machine.

A further object of this invention is to provide a machine tool of the above character for utilizing recorded information in numerical form.

Still another object is to provide a machine tool of the above character for producing a number of electrical pulses representative of the numerical information.

A still further object of this invention is to provide a machine tool of the above character for producing a movement of a part of the machine a distance proportional to the number of electrical pulses produced.

Another object of this invention is to provide a machine tool of the above character having a spindle for rotating a workpiece and a tool movable relative to the workpiece for cutting a cam.

A further object is to provide a machine tool of the above character for synchronizing the movement to the tool with the spindle rotation so as to cut three dimensional cams.

Other objects and advantages will become apparent from the following detailed description and from the appended drawings and claims.

Figure 7:
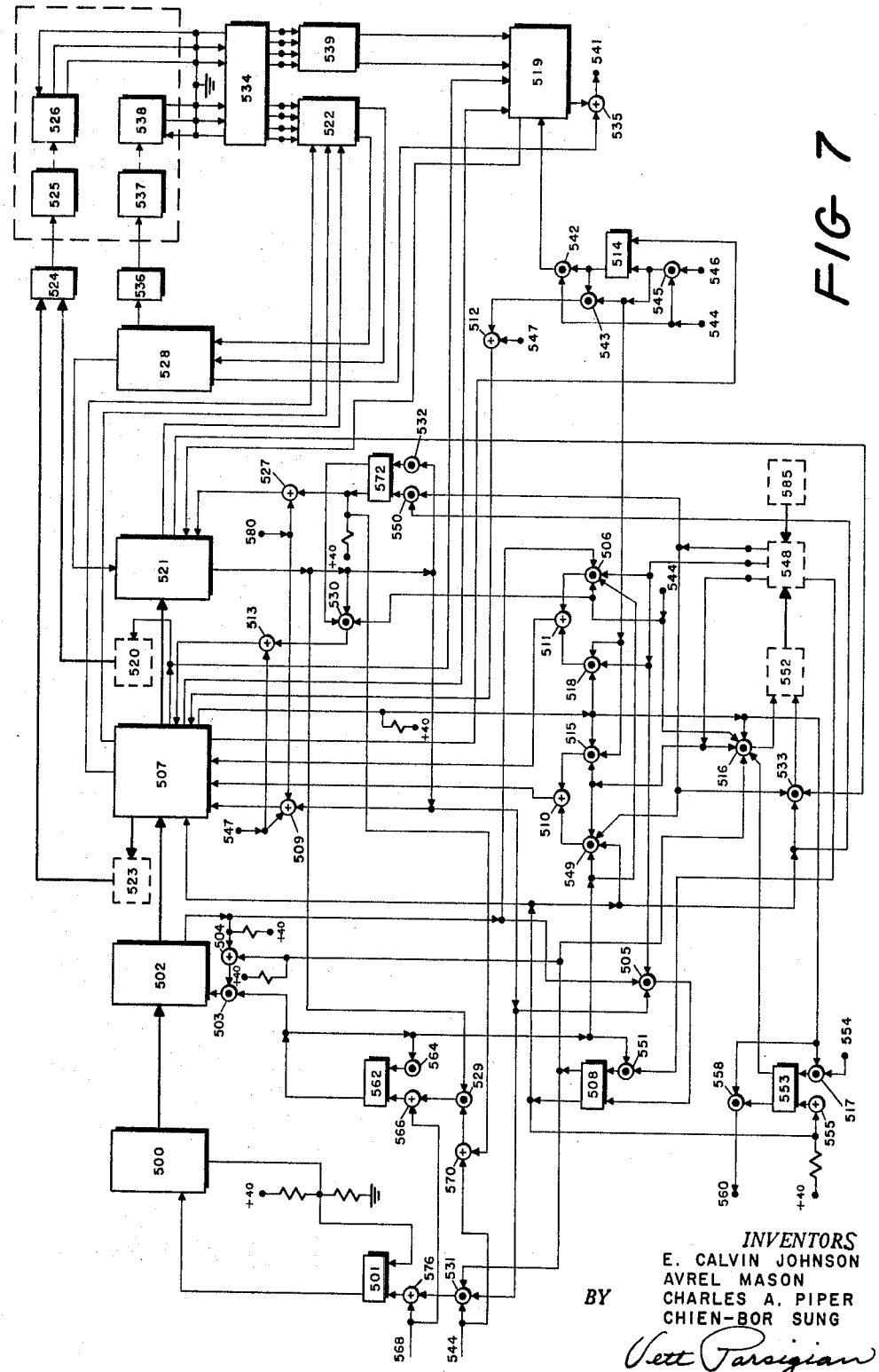
FIGURE 7 is a block diagram of a machine tool constituting one embodiment of this invention.

FIGURES 10 to 17, inclusive, show in detail the electronic components that may be included in certain blocks in FIGURE 7.

Figure 18:
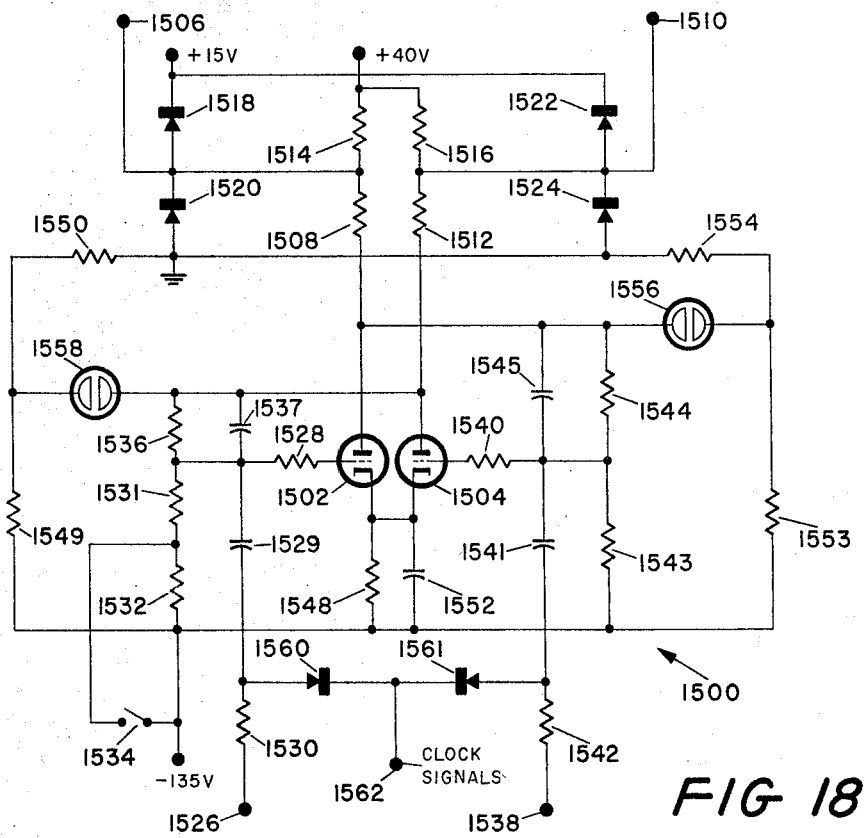

FIGURE 18 shows the circuitry that may be included in a particular type multivibrator used in the machine tool.

Figure 19:
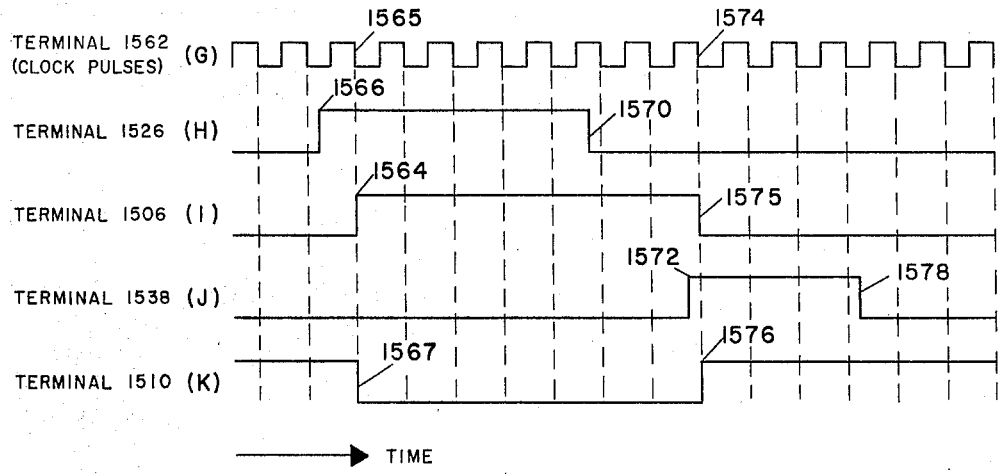

FIGURE 19 shows the relationship between the voltages at different terminals of the multivibrator in FIGURE 18.

Figure 20:
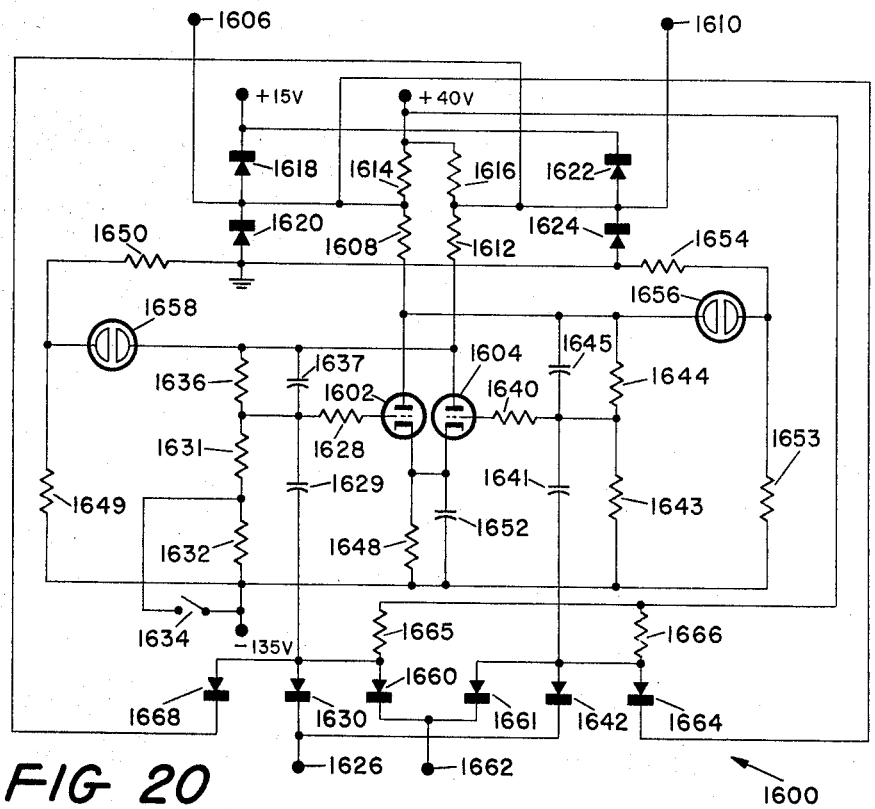

FIGURE 20 shows the circuitry that may be included in another type of multivibrator used in the machine tool.

Figure 21:
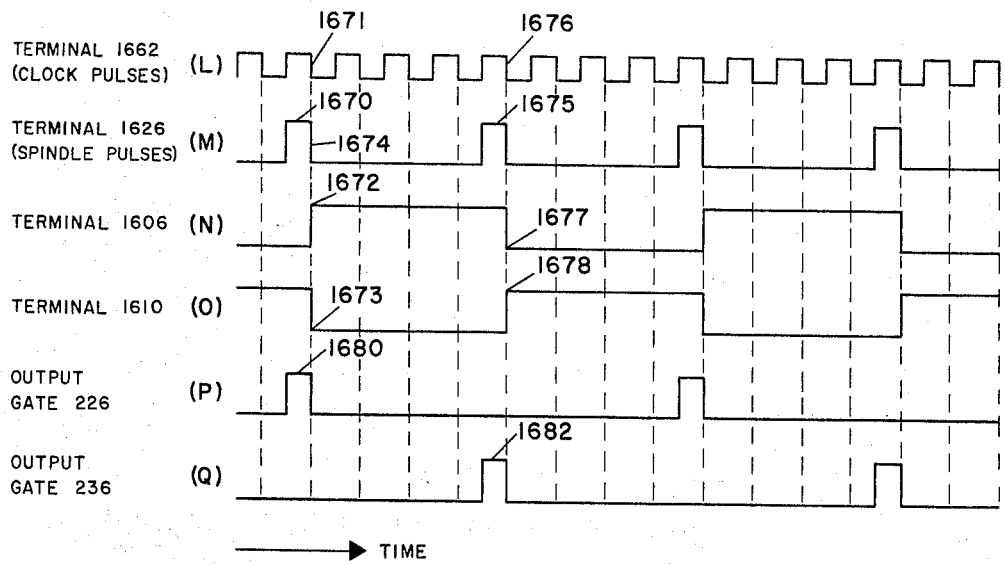

FIGURE 21 shows the relationship between the voltages at different terminals of the multivibrator in FIGURE 20.

Figure 13:
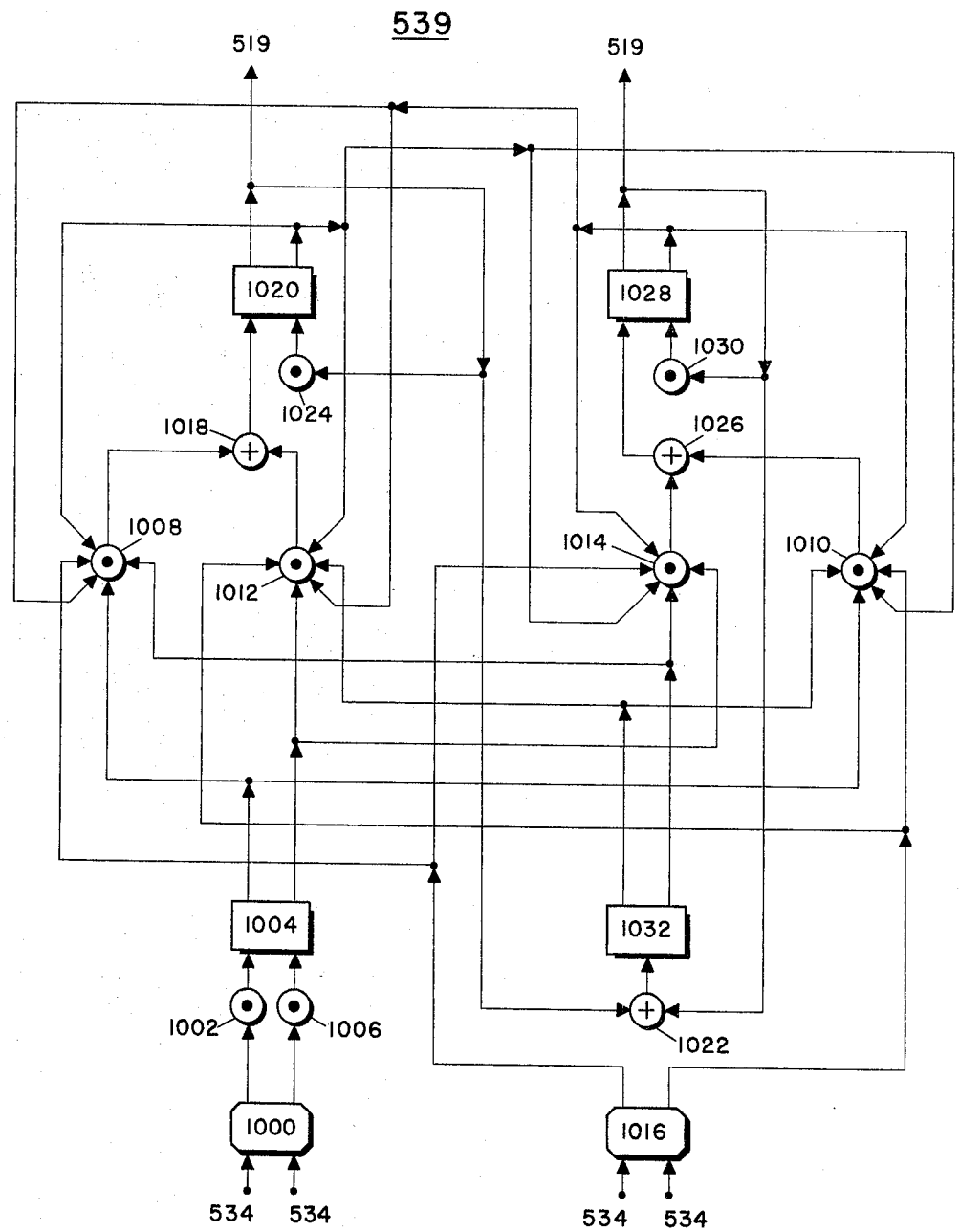

FIGURES 22 and 23 show the relationship between the voltages at strategic terminals in FIGURE 13 under two different conditions of machine operation.

FIGURE 24 is a side view of a cam blank illustrating paths of movement which may be followed by a tool to cut a three dimensional cam.

To facilitate the understanding of this invention it will first be explained in connection with the simplified block diagram in FIGURE 1.

A tape reader 100 has its output connected to a temporary storage register 102 which in turn has its output connected to an active storage register 104. The active storage register 104 has an output connected to an interpolator 108. The interpolator 108 has an output connected to an error register 110 and also has an output which is connected to the tape reader 100, the temporary storage register 102 and the active storage register 104. The interpolator 108 introduces a particular number of electrical pulses to the error register in accordance with information fed to the tape reader 100, as will be hereinafter described.

A spindle control 106 and the error register 110 have their outputs connected to servo amplifiers 112 and 114, respectively. The output of the amplifier 112 is introduced to a spindle drive 116. The drive 116 may include the combination of a torque motor, a valve and a hydraulic motor, known to persons skilled in the art. The voltage output of the servo amplifier 112 is introduced to the torque motor to produce a displacement of the motor a distance proportional to the magnitude of the voltage and in a direction determined by the polarity of the voltage. This controls the opening of the valve for introducing fluid under pressure to the hydraulic motor for driving the motor at a speed and in a direction dependent upon the magnitude and polarity of the voltage output from the servo amplifier.

The drive 116 operates to rotate a shaft 118 journalled in a frame 120. The shaft 118 is provided with a pair of bevel gears 122 and 124 and a gear 126. During a rotation of the shaft 118, the gear 122 drives a bevel gear 128 which rotates a spindle 130 and a workpiece, such as a cylindrical cam blank 132, mounted on the spindle. A tail stock 134 supports the cam blank 132 at its opposite end.

During the rotation of the shaft 118 the gear 124 drives a bevel gear 136 for rotating a lead screw 138 which is screwed into a carriage 140. The rotation of the screw will produce a movement of the carriage relative to the frame 120 and in the directions indicated by the arrows at 142. This movement is in an axial direction relative to the cam blank 132.

The rotation of the shaft 118 also causes the gear 126 to drive a gear 144 which rotates a shaft 146 and a spindle reading head 148 on the shaft. The reading head 148 may be a magnetic reading head which is adapted to produce at its output a particular number of electrical pulses at uniform intervals during each revolution of the reading head 148. Magnetic reading heads are commercially available and their operation is known to persons skilled in the art. For example, Telecomputing Company of California makes a magnetic reading head Model No. 15A which may be conveniently used to produce electrical pulses.

Since the reading head 148 and the spindle 130 are driven from the same shaft 118, the reading head produces a particular number of pulses at uniform intervals for each revolution of the spindle. For example, the gear ratios may be such as to produce an output of 576 pulses during each revolution of the spindle 130 or an output of 16 pulses for each 10° angular movement of the spindle. These pulses, which will hereafter be referred to as "spindle pulses," are introduced to the interpolator 108.

The output of the servo amplifier 114 is introduced to a cross feed drive 150 mounted on the carriage 140. The drive 150 may be similar to the drive 116 and operates to rotate a lead screw 152 which is screwed into a tool carriage 154. The rotation of the screw 152 will produce a movement of the tool carriage 154 relative to the carriage 140 and in the directions indicated by the arrows at 156. This movement is in a radial direction relative to the cam blank 132 and may be referred to as a cross feed movement relative to the cam blank. The cross feed movement is substantially perpendicular to the axial movement previously described. A tool holder 158 is mounted on the carriage 154 and a milling cutter or tool 160 is supported in the holder. A cutter drive 162 is adapted to rotate the cutter 160 at a high speed, such as 3600 revolutions per minute.

Since the tool carriage 154 is mounted for movement with the carriage 140, in the axial direction, the carriage 154 and, therefore, the tool 160 can simultaneously move in an axial and radial direction relative to the cam blank 132 upon rotation of the lead screws 138 and 152. The distance moved in each direction is dependent upon the pitch of the screws 138 and 152. For example, the pitch of the screw 138 may be such as to produce a .005 inch movement of the tool 160 in the axial direction for each revolution of the spindle 130 and the pitch of the screw 152 may be such as to produce a .02 inch movement of the tool in the radial direction for each revolution of the screw.

Figure 1:
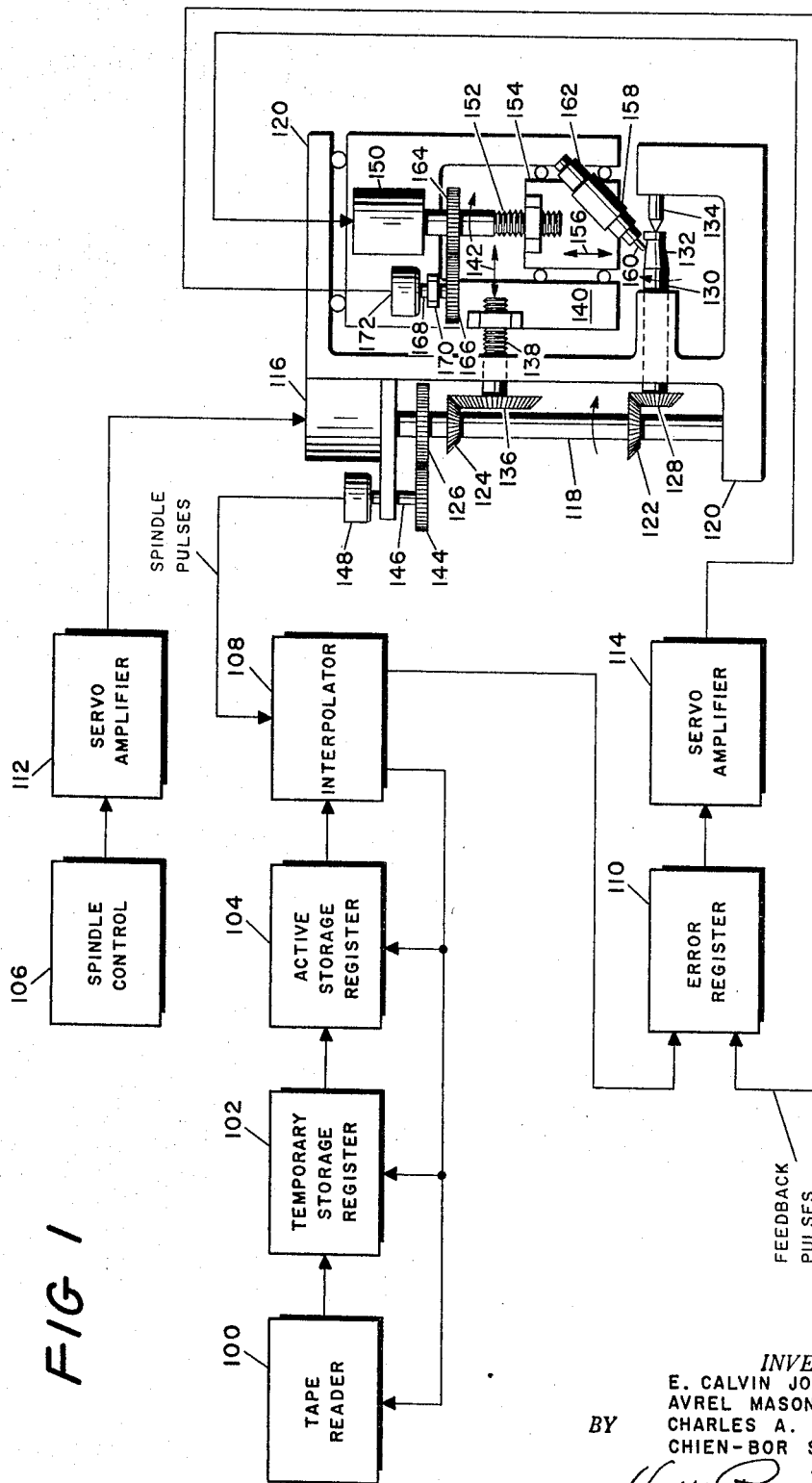
FIGURE 1 is a simplified block diagram of a machine tool representing an embodiment of this invention.

When the shaft 118 rotates in a clockwise direction as indicated in FIGURE 1, the tool 160 moves axially to the right. The tool 160 moves axially to the left when the shaft 118 is rotated in the opposite direction. Similarly, the tool moves radially towards the axis of the cam blank when the screw 152 rotates in a clockwise direction as shown in FIGURE 1 and the tool moves radially away from the axis of the cam blank when the screw rotates in the opposite direction.

A gear 164 on the screw 152 drives a gear 166 for rotating a shaft 168 which is journalled in a bearing support 170 mounted on the carriage 140. The shaft 168 rotates a cross feed reading head 172 on the shaft. The reading head 172 may be similar to the reading head 148 and produces a particular number of electrical pulses at uniform intervals for each revolution of the screw 152. Since the carriage 154 drives the tool in the radial direction a distance proportional to the number of revolutions of the screw 152, the number of pulses produced by the reading head is proportional to the radial distance traveled by the tool 160. These pulses, which will hereafter be referred to as feedback pulses, are introduced to the error register 110.

As previously disclosed, the interpolator 108 introduces a particular number of electrical pulses to the error register 110 in accordance with information fed to the tape reader 100. This will be explained in connection with FIGURE 2 which shows electronic components that may be included in the temporary register 102, the active register 104 and the interpolator 108.

Figure 2:
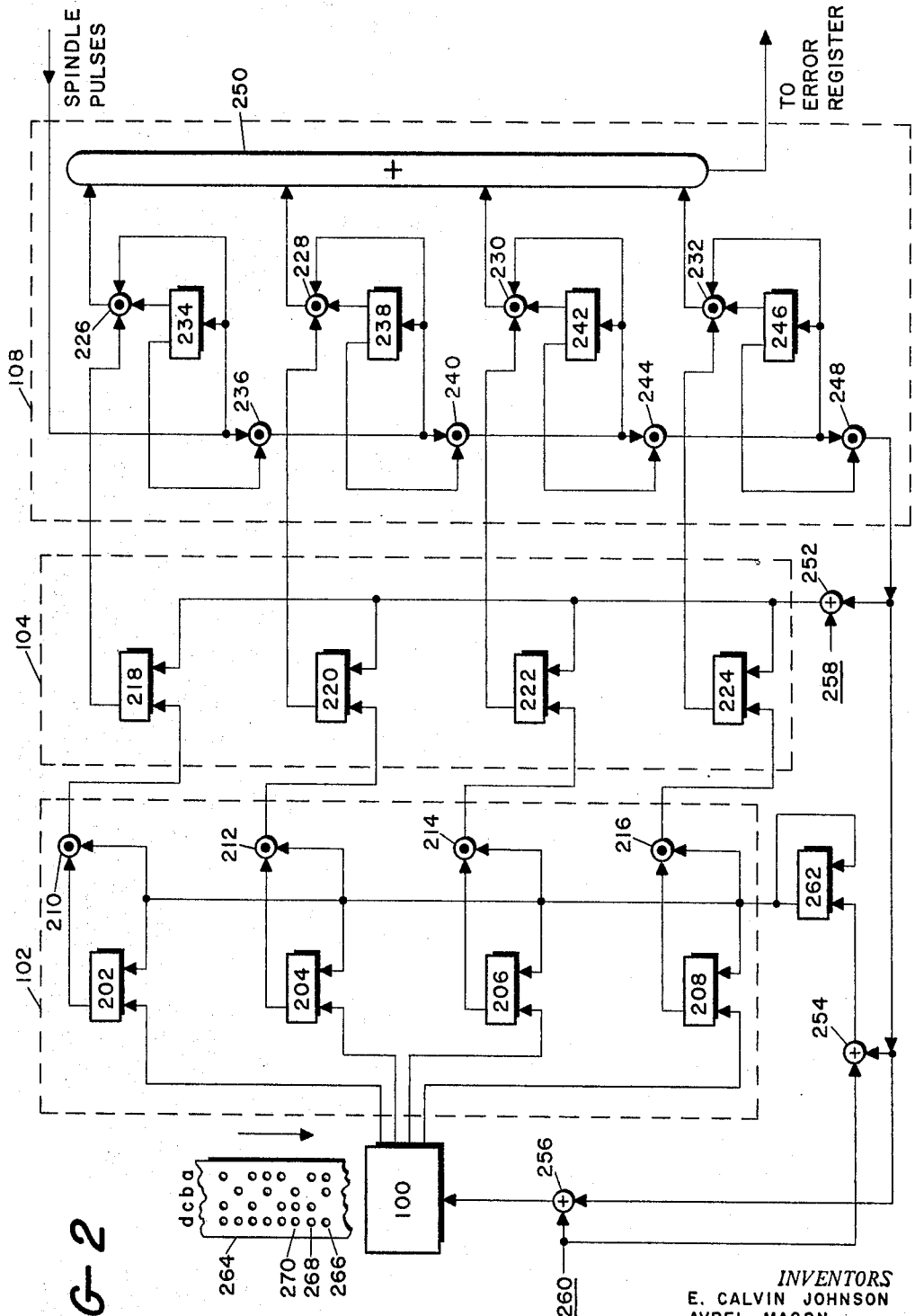
FIGURE 2 shows the electronic components that may be included in certain blocks in FIGURE 1.

In FIGURE 2, the tape reader 100 has an output connected to the left input of a two input bistable multivibrator 202.

Initially, the multivibrator 202 is operating with its left output "low" and its right output "high" and the left and right inputs are "low." The terms "high" and "low" will be used throughout this description to indicate the voltage level at particular terminals as in common binary network analysis. For example, in the network of FIGURE 2 "low" may represent $\underline{0}$ volts and "high" may represent $+15$ volts.

When the left input of the multivibrator 202 becomes high, the left output changes from low to high and the right output changes from high to low. The multivibrator will remain in this condition until the right input becomes high. When the right input becomes high, the multivibrator returns to its initial condition with the left output low and the right output high. The multivibrator will remain in this condition until the left input becomes high again.

Each multivibrator hereinafter described will be a two input bistable multivibrator if in the drawings it is shown to have the same configuration as the multivibrator 202 with inputs in the lower left and right sides of a block and with outputs in the upper left and right sides of the block. Certain inputs or outputs may not be shown if they are not utilized in the network. For example, the right output of multivibrator 202 is not shown since it is not utilized.

The tape reader 100 also has outputs connected to the left inputs of bistable multivibrators 204, 206 and 208. The left outputs of the multivibrators 202, 204, 206 and 208 are connected to inputs of diode "and" gates 210, 212, 214 and 216, respectively. An "and" gate in computer terminology is a gate which has a high output only when all of the inputs are high. If any of the inputs are low the output of the gate will be low. Each gate hereinafter described will be a diode "and" gate if it is shown in the drawings as a circle having a dot in its center.

The multivibrators 202, 204, 206 and 208 and the gates 210, 212, 214 and 216 are components which may be included in the temporary storage register 102 in FIGURE 1.

The gates 210, 212, 214 and 216 have their outputs connected to the left inputs of multivibrators 218, 220, 222 and 224, respectively. The multivibrators 18, 220, 222 and 244 are components that may be included in the active storage register 104 in FIGURE 1.

The left outputs of the multivibrators 218, 220, 222 and 224 are connected to inputs of gates 226, 228, 230 and 232, respectively. Electrical pulses such as may be produced by the spindle reading head 148 in FIGURE 1 are introduced to an input of the gate 226, to the input of a one input bistable multivibrator 234 and to an input of a gate 236. The right output of the multivibrator 234 is connected to an input of the gate 226 and its left output is connected to an input of the gate 236.

Initially, the multivibrator 234 is operating with its right output high and its left output low. When a first pulse is introduced to the input, the left output changes from low to high and the right output changes from high to low. The introduction of a second pulse will cause the multivibrator to return to its initial condition until the introduction of the next pulse. In this way the left and right outputs of the multivibrator 234 become alternately high upon the introduction of successive pulses to its input. Each multivibrator hereinafter described will be a one input multivibrator if in the drawings it is shown to have the same configuration as the multivibrator 234 with an input in the lower center of a block and with outputs in the upper left and right sides of the block.

The output of the gate 236 is connected to an input of the gate 228, to the input of a multivibrator 238 and to an input of a gate 240. The right output of the multivibrator 238 is connected to an input of the gate 228 and the left output is connected to an input of the gate 240.

The output of the gate 240 is connected to an input of the gate 230, to the input of a multivibrator 242 and to an input of a gate 244. The right output of the multivibrator 242 is connected to an input of the gate 230 and its left output is connected to an input of the gate 244.

The output of the gate 244 is connected to an input of the gate 232, to the input of a multivibrator 246 and to an input of a gate 248. The right output of the multivibrator 246 is connected to an input of the gate 232 and its left output is connected to an input of the gate 248.

The outputs of the gates 226, 228, 230 and 232 are connected to inputs of a diode "or" gate 250. An "or" gate in computer terminology is a gate which has a high output at any time that any of its inputs are high. Each gate hereinafter described will be a diode "or" gate if it is shown in the drawings as a circle or other enclosed figure with a plus sign in its center.

The output of the gate 248 is connected to an input of a gate 252, to an input of a gate 254 and to an input of a gate 256. Another input of the gate 252 is connected to a source 258 for the introduction of a pulse to the gate upon the manual operation of a switch. The output of the gate 252 is connected to the right inputs of the multivibrators 218, 220, 222 and 224 in the active storage register 104.

The gate 254 and the gate 256 have inputs connected to a source 260 for the introduction of a pulse to the gates upon the manual operation of a switch. The output of the gate 254 is connected to the left input of a multivibrator 262. The left output of the multivibrator 262 is connected to the right input of the multivibrator, to inputs of the gates 210, 212, 214 and 216 and to the right inputs of the multivibrators 202, 204, 206 and 208 in the temporary storage register 102. The output of the gate 256 is connected to the tape reader 100.

The gates 226, 228, 230 and 232, the gates 236, 240, 244 and 248, the multivibrators 234, 238, 242 and 246 and the gate 250 are components that may be included in the interpolator 108 in FIGURE 1. The output of the gate 250 which may be referred to as the output of the interpolator 108 is introduced to the error register 110 in FIGURE 1.

Recorded information such as may be provided on a tape 264 is fed to the tape reader 100. The information on the tape may represent a particular digit or number and such information may be in coded form. It has been found convenient to utilize such numerical information in binary coded form. For example, each successive transverse row of punched holes on the tape 264, such as the rows 266, 268 and 270 represents numerical information in binary coded form.

Each row has four positions, namely, positions $a$, $b$, $c$ and $d$ for representing the coded information. A hole punched at a particular position indicates the presence of certain information at the position and the omission of a punched hole indicates the absence of any information at the position. The punched holes at positions $a$, $b$, $c$ and $d$ in any row may represent binary numbers $(2^3)$, $(2^2)$, $(2^1)$ and $(2^0)$, respectively.

The binary numbers in each row are added to one another to provide the particular number represented by the row. For example, in row 266 holes are punched at positions $a$, $b$ and $d$ to indicate $2^3+2^2+2^0$ which is equivalent to $8+4+1$ or the number 13. Similarly, the row 268 contains the binary information $2^3+2^1+2^0$ representing the number 11 and the row 270 contains the binary information $2^3+2^1+2^0$ representing the number 7.

The tape reader 100 is adapted to read or sense the numerical information present at each position in a row of the tape 264. When a punched hole is present at a particular position, the output of the tape reader associated with the position becomes high and the left input of the multivibrator connected to that output of the tape reader also becomes high. The multivibrators 202, 204, 206 and 208 are associated with positions $a$, $b$, $c$ and $d$, respectively, and their inputs become high whenever a punched hole is present in the associated position. For example, since punched holes are present in positions $a$, $b$ and $d$ of row 266, the left inputs of the multivibrators 202, 204 and 208 become high when the tape reader reads the information in row 266. The left input of the multivibrator 206 will remain low because of the absence of a punched hole in position $c$.

Tape readers for reading binary coded information as disclosed above are commercially available. For example, the tape reader which Commercial Controls Corporation normally builds into its Model FL Flexowriter has been successfully used.

In the operation of the system in FIGURE 2, a high input is initially introduced to the gate 252 from the source 258 upon a momentary closure of a switch. This produces a high output at the gate 252 for introduction to the right inputs of the multivibrators 218, 220, 222 and 224 in the active storage register 104. This causes the right outputs of the multivibrators to become high and their left outputs to become low. In this way any information that may have been present in the active storage register 104 is cleared and the multivibrators 218, 220, 222 and 224 are in condition to receive additional information.

After the introduction of the high input to the gate 252, a high input is introduced to the gates 254 and 256 from the source 260 upon a momentary closure of another switch. The high input when introduced to the gate 254 produces a high output at the gate for introduction to the left input of the multivibrator 262. This causes the left output of the multivibrator 262 to become high for introduction to the gates 210, 212, 214 and 216 so as to open the gates and to transfer any information present in the temporary storage register 102 to the active storage register 104. The high left output of the multivibrator 262 is also introduced to the right inputs of the multivibrators 202, 204, 206 and 208 to clear the information in the temporary storage register 102 in the same manner as the information in the active storage register 104 was cleared.

The source 260 also introduces a high input to the gate 256 as previously disclosed. The resultant high output of the gate 256 is introduced to the tape reader 100 which advances the tape 264 so as to place the row 266 into position for being read. As previously disclosed, the information in the row 266 will cause the left inputs of the multivibrators 202, 204 and 208 to become high. This in turn will cause the left outputs of the multivibrators 202, 204 and 208 and inputs of the gates 210, 212 and 216 to become high.

In the manner disclosed above, the introduction of a high input to the gate 252 and the subsequent introduction of a high input to the gates 254 and 260 will clear any information present in the active storage register 104, will transfer any information present in the temporary storage register 102 to the active storage register 104, will clear any information present in the active storage register 102 and will place the binary information in the row 266 into the temporary storage register 102.

Both the temporary storage register 102 and the active storage register are required in the system because of the relatively slow rate at which the tape reader 100 reads the information on the tape. The active register 507 makes the information continuously available to the system while the tape reader is placing additional information in the temporary register 502.

After the above disclosed operation, a second high input is manually introduced to the gate 252 from the source 258. This clears any information in the active storage register 104 which may have been transferred to the register from the temporary storage register 102. Subsequently, a second high input is manually introduced to the gates 254 and 256 from the source 260. This causes a transfer of the information in the temporary storage register 102 to the active storage register 104 and also clears the information in the temporary storage register 102. The high input introduced to the gate 256 results in an output at the gate for introduction to the tape reader 100 to advance the tape 264 so as to place the row 268 into position for being read. When this information is read by the tape reader 100, the information is introduced to the temporary register 102 for storage.

It is evident from the above description that two successive introductions of high inputs to the gate 252 and to the gates 254 and 256 will place the binary information in the rows 266 and 268 into the registers 104 and 102, respectively.

The machine tool in FIGURE 1 is now in readiness for automatic operation. Initially, hydraulic power is applied to the spindle drive 116 and the cross feed drive 150 and the spindle control 106 is set into operation to introduce a voltage to the servo amplifier 112 for rotating the drive 116 at a particular speed and in a particular direction. As will be latter disclosed, the rotation of the spindle drive 116 may be actually controlled from recorded information which has been fed to the active register 104.

The spindle control 106 may be set to rotate the drive 116 and the shaft 118 in a clockwise direction as shown by the arrow in FIGURE 1. This causes the spindle 130 to be driven in a clockwise direction as viewed from the tail stock 134 and the reading head 148 to be driven to produce a particular number of pulses for each revolution the spindle 130. As previously disclosed, the reading head 148 may produce 576 electrical pulses for each revolution of the spindle 130 or 16 pulses for each 10° angular movement. These pulses are introduced to the gate 226, the multivibrator 234 and the gate 236 in the interpolator 108.

Figure 3:
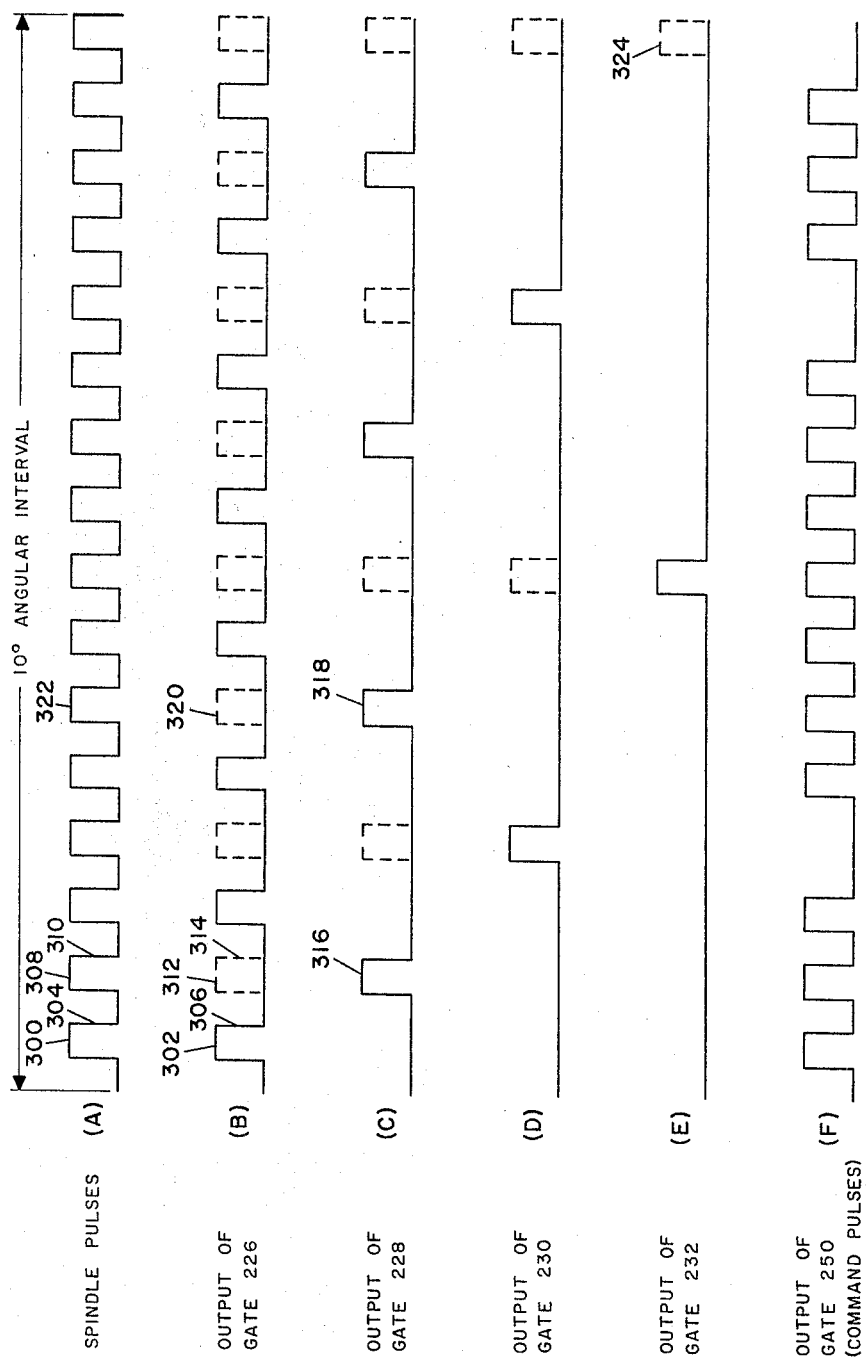
FIGURE 3 shows the relationship between different voltages at strategic points in FIGURE 2.

In FIGURE 3, waveform A shows 16 spindle pulses which are introduced to the multivibrator 234 during a rotation of the spindle 130 through a 10° angular interval. Initially, the right output of the multivibrator 234 is high and introduces a high input to the gate 226. The input of the gate 226 connected to the multivibrator 218 is also high because of the information that has been previously transferred to the multivibrator from the tape 264 via the multivibrator 202 in the temporary storage register 102. Since the remaining input of the gate 226 becomes high during the application of the first spindle pulse 300, the gate opens and produces an output 302 as shown in waveform B of FIGURE 3. When the "fall" 304 of the spindle pulse 300 occurs, the right output of the multivibrator 234 is changed from high to low and the gate 226 is closed. This causes the fall 306 at the output of the gate. It will be noted that the output 302 of the gate 226 is actually a pulse which coincides with or is synchronized with the spindle pulse 300.

The fall 304 of the pulse 300 also causes the left output of the multivibrator 234 to change from low to high. The left output remains high until the second spindle pulse 308 has its fall 310. Therefore, the input of the gate 236 connected to the left output of the multivibrator 234 is high during the period between the fall 304 and the fall 310. Since the second spindle pulse is applied to the gate 236 during this period, the gate opens and produces an output 312 as shown in dotted lines in waveform B. When the fall 310 of the second spindle pulse 308 occurs, the left output of the multivibrator 234 becomes low and the gate 236 is closed. This causes the fall 314 at the output of the gate. It will be noted that the output of the gate 236 is actually a pulse which is synchronized with the second spindle pulse 308. This pulse is introduced to the input of the multivibrator 238.

In the manner disclosed above, each odd spindle pulse produces a synchronized pulse output at the gate 226 as shown by the solid line pulses in waveform B and each even spindle pulse produces a synchronized pulse output at the gate 236 as shown by the dotted line pulses in waveform B. In this way, the first stage of the interpolator 108 actually acts as a divider to produce at the output of the gate 226 a number of pulses equal to one-half the number of spindle pulses. Since 16 spindle pulses are produced during each 10° angular interval, 8 pulses are produced at the output of the gate 226. Similarly, a number of pulses equal to one-half of the spindle pulses, or 8 pulses, is produced at the output of the gate 236 for introduction to the second stage of the interpolator 108.

In the same manner as described above, the second stage will produce at the output of the gate 228 a number of pulses equal to one-half of the pulses introduced to the stage. The output pulses are shown by the solid line pulses in waveform C in FIGURE 3. It will be noted that each pulse output of the gate 228 is synchronized with every alternate pulse introduced to the second stage from the output of the gate 236 and is also synchronized with a spindle pulse. For example, the pulse 316 is synchronized with the pulse 312 and spindle pulse 308 and the pulse 318 is synchronized with the pulse 320 and the spindle pulse 322. The pulses produced at the output of the gate 240 are shown by the dotted lines in waveform C.

The output of the gate 240 is introduced to the third stage of the interpolator 108 to produce at the output of the gate 230 the pulses shown in solid lines in waveform D and to also produce at the output of the gate 244 the pulses shown in dotted lines in waveform D. Similarly, the output of the gate 244 is introduced to the fourth stage of the interpolator to produce at the output of the gate 232 the pulse shown in a solid line in waveform E and to produce at the output of the gate 248 the pulse 324 shown in dotted lines in waveform E.

From the waveforms in FIGURE 3, it is evident that each stage in the interpolator 108 divides by a factor of 2 the number of spindle pulses introduced to the stage. The 16 spindle pulses introduced to the interpolator may result in the production of 8 pulses at the output of the gate 226, 4 pulses at the output of the gate 228, 2 pulses at the output of the gate 230 and 1 pulse at the output of the gate 232. Also, the number of pulses that may be produced at the outputs of the gates 226, 228, 230 and 232 is equal to the value of the binary information that may be present at positions $a$, $b$, $c$ and $d$, respectively, in a row of the tape 264. A hole punched at position $a$ represents the binary number ($2^3$), and 8 pulses may be produced at the output of the gate 226. Similarly, holes punched at positions $b$, $c$ and $d$ represent binary numbers ($2^2$), ($2^1$) and ($2^0$) respectively, and 4 pulses, 2 pulses and 1 pulse may be produced at the outputs of the gates 228, 230 and 232, respectively.

In row 266 on the tape, a hole is omitted at position *c*. Since this causes the output of the multivibrator 222 and an input of the gate 230 to be low, the gate remains closed and no pulses are produced at its output. However, the punched holes at positions *a*, *b* and *d* will open the gates 226, 228 and 232, respectively, to introduce the outputs of the gates to the gate 250 which produces at its output the 13 pulses shown in waveform F in FIGURE 3. The numerical information in the row 266 is thus converted into an equivalent number of pulses at the output of the interpolator 108 for introduction to the error register 110.

The output of the gate 248, the pulse 324 in waveform E, may be referred to as the "overflow" of the interpolator 108. The overflow pulse 324 is introduced to the gate 252 to clear the information in the active storage register 104 and is also introduced to the gate 256 to advance the tape 264 so that the tape reader 100 will start reading the information in the next row 270.

The overflow pulse 324 is also introduced to the left input of the multivibrator 262 through the gate 254. This causes the left output of the multivibrator 262 to become high for transferring the information in the temporary register 102 to the active register 104 and to clear the information in the temporary register 102 so that it will be readied to receive the information in the row 270 being read by the tape reader 200.

The function of the multivibrator 262 is to delay the application of the overflow pulse 324 to the temporary register 102 so that its information will be transferred to the active register 104 a short while after the register 104 has been cleared by the direct application of the pulse 324 through the gate 252. Although the overflow pulse 324 is applied to the tape reader 100 before its delayed application to the temporary register 102, the information in the register is transferred and cleared before additional information is received. This is true because of the relatively long period of tape reading time as compared to the time required to transfer and clear the information in the temporary register 102, which is practically instantaneous.

In the manner disclosed, the overflow pulse 324 causes the information in the row 268 to be placed into the active register 104 and the information in the row 270 to be placed into the temporary register 102. Initially, the information in the row 266 produced 13 pulses at the output of the interpolator 108 during a first 10° rotation of the spindle 130. As the spindle rotates through its second 10° angular interval, the information in the row 268 which has been placed in the active register produces 11 pulses at the output of the interpolator by opening the gates 226, 230 and 232. The next overflow pulse clears the active register 104, transfers and clears the information in the temporary register 102, and causes the information on the next row of the tape to be introduced to the register 102. Since the information in the row 270 has now been placed in the active register 104, 7 pulses are produced at the output of the interpolator 108 during the third 10° interval rotated by the spindle 130. In the same manner, the information on each successive row of the tape produces a particular number of pulses at the output of the interpolator 108 during each successive 10° interval rotated by the spindle 130.

The interpolator 108 is actually a four stage binary counter with additional circuitry. The spindle pulses produced during each interval are counted by the interpolator. The count at any time is proportional to the position of the spindle in the interval. When the last pulse in the interval is counted indicating that the interval has been completely transversed, the counter returns to its zero position and an overflow pulse is produced at the output of the gate 248. The overflow pulse causes new information to be introduced into the active register 104 and the interpolator initiates a new count of the spindle pulses produced during the next angular interval.

The pulse output of the interpolator 108 and the feed back pulses produced by the cross feed reading head 172 are introduced to separate inputs of the error register 110 as shown in FIGURE 1. The register 110 is adapted to produce at its output a voltage which is proportional to the difference in the number of pulses introduced to the separate inputs. When the number of pulses introduced to the inputs is equal, the difference or error is reduced to zero and the output voltage of the register 110 is zero. The error register 110 may include a reversible binary counter which adds one unit for each pulse received at one input and subtracts one unit for each pulse received at the other input and also includes means for converting the count into a proportionate voltage. Electronic circuitry for accomplishing this in the error register will be described more fully in connection with the block diagram in FIGURE 7.

During the rotation of the spindle 130 through its first 10° angular interval, the pulses in waveform F (FIGURE 3) are produced at the output of the interpolator 108 and are introduced to an input of the error register 110. The first and successive pulses are counted by the register 110 and the count is immediately converted into a proportionate voltage for introduction to the servo amplifier 114 to rotate the cross feed drive 150 and the lead screw 152. For example, the drive 150 and the lead screw 152 may be rotated in a clockwise direction as shown in FIGURE 1. At the same time, this will cause a rotation of the cross feed reading head 172 and the production of feed back pulses for introduction to the other input of the error register 110 to reduce the count in the register. Each pulse introduced to the error register 110 from the interpolator 108 will rotate the drive 150 a particular distance and will cause the tool 160 to move in a radial direction relative to the cam blank 132 a particular unit distance. For example, the tool 160 may move a unit distance of .0002 inch in the radial direction for each pulse introduced to the register 110 from the interpolator 108. Since each output pulse from the interpolator 108 "commands" the tool 160 to move a unit distance, these pulses will be hereafter referred to as command pulses.

Because of the geared relationship between the screw 152 and the reading head 172, the reading head 172 will produce one feedback pulse for each unit movement of the tool 160 in the radial or cross feed direction. This feedback pulse is fed to the error register 110 to minimize the error in the register.

Since 13 command pulses are introduced to the error register 110 during the first 10° rotation of the spindle, the tool will move 13 units or .0026 inch in the cross feed direction. This movement will be towards the axis of the cam blank 132 when the drive 150 rotates in a clockwise direction. Each unit movement will cause the production of a feedback pulse until a total of 13 feedback pulses have been produced when the tool has moved the commanded distance. These feedback pulses reduce the error in the register 110 to zero so that there will be no further movement of the tool in the cross feed direction unless additional command pulses are fed to the error register 110.

Figure 4:
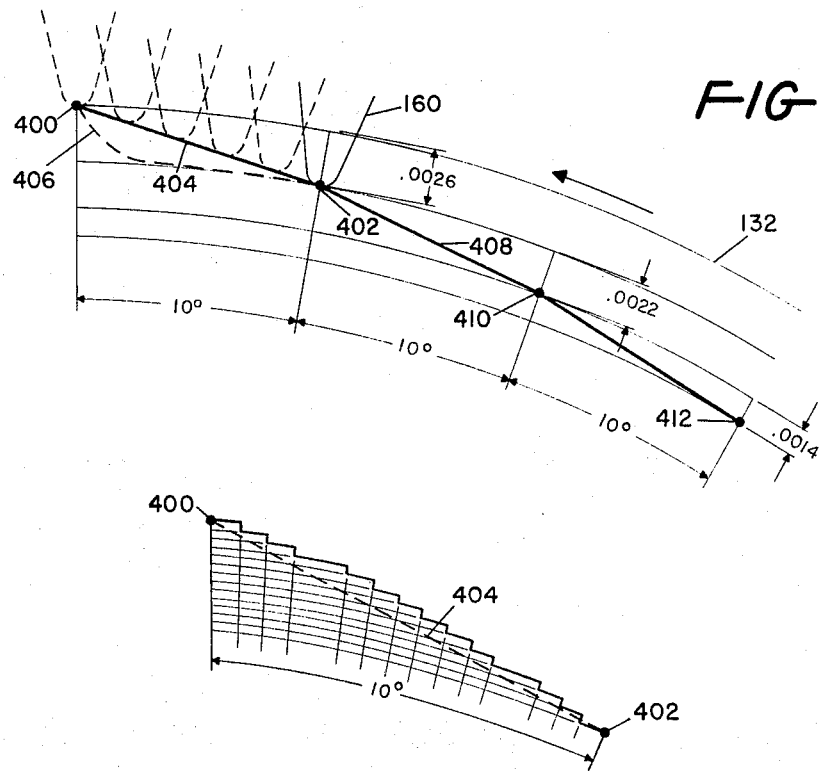
FIGURE 4 is an end view of a cam blank illustrating a movement of a tool in a radial direction relative to the cam blank.

In FIGURE 4, the tool 160 is initially positioned at point 400 on the surface of the cam blank 132 as viewed from the spindle 130. When the spindle starts to rotate and rotates the cam blank in the direction shown, the tool 160 may move in a radial direction relative to the cam blank. During the rotation of the cam blank through a 10° interval, the tool will move a distance controlled by the information present in the active storage register 104. For example, the numerical information in the row 266 of the tape 264 will produce a cross feed movement of 13 units or .0026 inch and will position the tool 160 at point 402 on the cam blank 132 after its rotation through a 10° interval. This relative movement between the rotary tool 160 and the cam blank produces a cutting of the cam blank surface between the points 400 and 402, which will be referred to as datum points.

It will be noted that the path between points 400 and 402 is substantially a straight line 404. The reason for this is that the command signals as shown in waveform F in FIGURE 3 are produced at substantially uniform intervals to maintain a balanced control of the movement between the datum points 400 and 402. If a balanced control were not maintained between the datum points, the cut between points would be very irregular. For example, if most of the command pulses were produced during the first portion of the 10° angular interval, the tool could conceivably follow the irregular path 406. This would be very undesirable and, therefore, the maintenance of a balanced control is very important.

While the first 10° angular interval is being traversed, the information in the active storage 104 specifies a 13 unit movement in the cross feed direction. However, this information does not specify the desired positions of the cross feed throughout the interval between the points 400 and 402. In order to specify these positions, an interpolation procedure is carried out by the interpolator 108. The interpolator 108 operates in conjunction with the active storage register 104 to select particular spindle pulses throughout the interval. The pulses are selected at substantially uniform intervals so that the cross feed movement will be approximately a linear function of the spindle position throughout the angular interval. It is in this manner that a balanced control is maintained of the cross feed movement of the tool.

Figure 5:
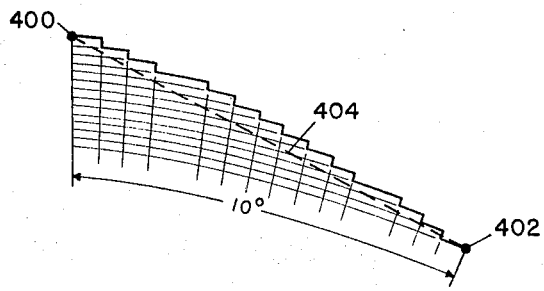
FIGURE 5 illustrates the tool movement between certain points on the cam blank in FIGURE 4.

Theoretically, the 13 command pulses in waveform F would produce a 13 step movement between the datum points 400 and 402 as illustrated in FIGURE 5. This movement is itself a good approximation to the straight line 404. Since the corners of the steps will be actually rounded off because of the finite response time of the cross feed servo system, the approximation to the straight line 404 becomes very close.

Since the information in row 268 representing the number 11 is placed in the active register 104 during the rotation of the cam blank 132 through its next 10° interval, the tool 160 will cut along a path 408 from the datum point 402 to the datum point 410, a distance of 11 units or .0022 inch in the radial direction. Similarly, the information in row 270 representing the number 7 will move the tool 160 a distance of 7 units or .0014 inch from the datum point 410 to a point 412 during the third 10° interval. It will be notel that the information in any row represents a "difference" between a previous datum point and a succeeding one.

Figure 6:
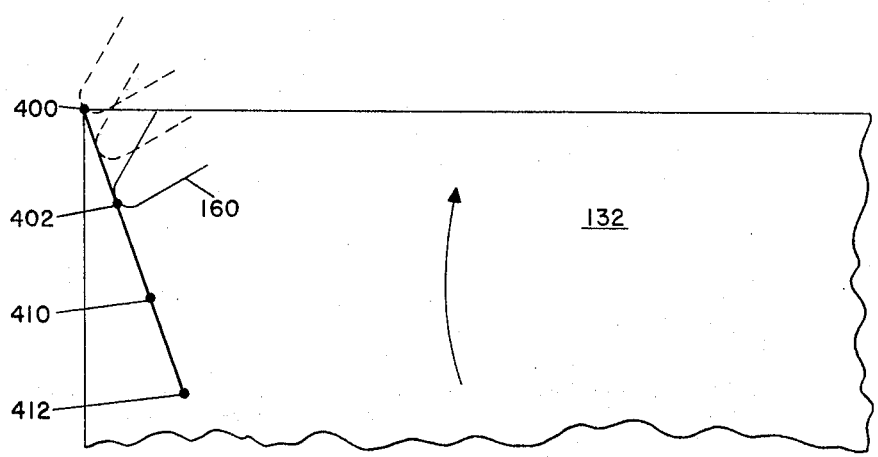
FIGURE 6 is a side view of the cam blank in FIGURE 4 illustrating a movement of the tool in an axial direction relative to the cam blank.

As previously disclosed, the tool 160 also moves a particular distance in an axial direction relative to the cam blank 132 during the rotation of the spindle 130. For example, the tool may move an axial distance of .005 inch for each revolution of the spindle 130 or approximately .00014 inch for each 10° angular interval of rotation. Therefore, during each 10° angular interval, the tool moves relative to the cam blank 132 in a radial direction a distance signalled by the command pulses and at the same time moves a certain distance in the axial direction. FIGURE 6 illustrates this axial movement relative to the cam blank 132 during the rotation of the cam blank through the successive 10° intervals shown in FIGURE 4.

In the manner disclosed above, the tool 160 will traverse the entire surface of the cam blank 132 after a particular number of spindle revolutions and the surface will be cut in accordance with the information on the tape 264 to produce a three-dimensional cam having a desired contour.

FIGURE 7 is a block diagram of a machine tool constituting one embodiment of this invention.

A tape reader 500 has an output connected to the right input of a bistable multivibrator 501 and an output connected to a temporary storage register 502. The temporary storage register 502 has an input connected to the output of a gate 503 and has an output connected to an input of a gate 504, to an input of a gate 505 and to an input of a gate 506. The register 502 also has an output connected to an input of an active storage register 507.

Other inputs of the active register 507 are connected, respectively, to the left output of a multivibrator 508, to the output of a gate 509, to the output of a gate 510, to the output of a gate 511, to the output of a gate 512 and to the output of a gate 513. The register 507 has an output connected to the right input of a multivibrator 514. Another output of the register 507 is connected to an input of a gate 515, to an input of a gate 516, to an input of a gate 517, to an input of a gate 558 and to an input of a gate 518. Still another output of the register 507 is connected to an input of a buffer register 519 and a further output is connected to another input of the buffer register 519 and to the input of a spindle direction control 520. Four other outputs of the active register 507 are connected, respectively, to an input of an interpolator 521, to an input of a cross feed synchronizer 522, to another input of the cross feed synchronizer 522 and to the input of a spindle speed control 523.

The spindle direction control 520 and the spindle speed control 523 have their outputs connected to inputs of a servo amplifier 524. The output of the amplifier 524 is introduced to a spindle drive 525 which is mechanically coupled to a spindle reading head 526. The drive 525 and the reading head 526 correspond to the drive 116 and the reading head 148 in FIGURE 1.

Other inputs of the interpolator 521 are connected, respectively, to the output of a gate 527, to an output of the buffer register 519 and to an output of an error register 528. The interpolator 521 has an output connected to an input of a gate 529, to an input of a gate 530, to an input of the gate 509, to an input of the gate 505, to an input of a gate 531 and to an input of a gate 532. Another output of the interpolator 521 is connected to an input of a gate 533 and a further output is connected to an input of the cross feed synchronizer 522.

The cross feed synchronizer 522 has four inputs connected to outputs of a demodulator 534 and has two outputs connected to inputs of the error register 528. The error register 528 has an output connected to an input of a gate 535 and has an output connected to a servo amplifier 536. The output of the amplifier 536 is introduced to a cross feed drive 537 which is mechanically coupled to a cross feed reading head 538. The drive 537 and the reading head 538 correspond to the drive 150 and the reading head 172 in FIGURE 1. The reading head 538 has an input connected to an output of the demodulator 534 and has two outputs connected to inputs of the demodulator. The demodulator 534 also has an output connected to an input of the spindle reading head 526 and has two inputs connected to outputs of the reading head. Four other outputs of the demodulator 534 are connected to inputs of a spindle pulse synchronizer 539 which has two outputs connected to inputs of the buffer register 519.

The buffer register 519 has an output connected to an input of the gate 535. The output of the gate 535 is connected to an emergency stop relay control 541. The buffer register 519 also has an input connected to the output of a gate 542. An input of the gate 542 is connected to the left output of the multivibrator 514 which is also conneced to an input of a gate 543. Another input of the gate 542 is connected to a source 544 which introduces a high input to the gate upon the closure of a switch to operate the machine tool automatically. In input of a gate 545 is also connected to the source 544. Another input of the gate 545 is connected to a reference market switch 546 which introduces a high input to the gate when the spindle 130 (FIGURE 1) rotates through a particular reference point to close the switch as will be hereinafter described. The output of the gate 545 is connected to the left input of the multivibrator 514, to an input of the gate 543 and to inputs of the gates 515 and 518. The output of the gate 543 is connected to an input of the gate 512 which also has an input connected to a tape advance 547 which introduces a high input to the gate upon the manual closure of a switch.

An output of a pass counter 548 is connected to inputs of the gates 506, 518 and 505. The outputs of gates 506 and 518 are connected to the inputs of the gate 511. Another output of the pass counter 548 is connected to gates 516, 515 and a gate 549. The outpults of the gates 515 and 549 are connected to inputs of the gate 510. Still another output of the pass counter 548 is connected to inputs of gates 533, 549 and a gate 550. A fourth output of the pass counter is connected to an input of a gate 551. An input of the pass counter 548 is connected to the output of a pass counter control 552 and another input is connected to the output of a number of passes required control 585.

The pass counter control 552 has an input connected to the output of the gate 516 and an input connected to the output of the gate 533. An input of the gate 516 is connected to the source 544 and another input is connected to the right output of the multivibrator 508. Still another input of the gate 516 is connected to the right output of a multivibrator 533.

The right input of the multivibrator 553 is connected to the output of the gate 517 which has an input connected to a source 554 for introducing a high input to the gate when the machine tool is being manually operated and the source 544 is low. The left input of the multivibrator 553 is connected to the output of a gate 555 which has an input connected to the left output of the multivibrator 508. The left output of the multivibrator 553 is connected to an input of the gate 558 which has its output connected to an automatic stop relay control 560.

An input of the gate 506 is connected to the source 544. Another input of the gate 506 is connected to the left output of a multivibrator 562. The left output of the multivibrator 562 is also connected to an input of the gate 503, to an input of a gate 564, to an input of the gate 551 and to an input of the gate 549. The right input of the multivibrator 562 is connected to the output of the gate 564 and the left input of the multivibrator is connected to the output of a gate 566 which has an input connected to the output of the gate 529 and an input to connected to a tape advance 568 for introducing a high input the gate upon a manual closure of a switch.

The gate 529 has an input connected to the output of a gate 570 which has an input connected to the left output of a multivibrator 572 and another input connected to the source 544. The source 544 is also connected to an input of the gate 531 which has an input connected to the right output of the multivibrator 508. The output of the gate 531 is connected to an input of a gate 576 which has another input connected to the tape advance 568. The output of the gate 576 is connected to the left input of the multivibrator 501. The left output of the multivibrator 501 is connected to the input of the tape reader 500.

The right output of the multivibrator 508 is connected to an input of the gate 504 which has its output connected to an input of the gate 503. The left output of the multivibrator 508 is connected to an input of the gate 549, to an input of the gate 533 and to an input of the gate 550. The left input of the multivibrator 508 is connected to the output of the gate 505.

The output of the gate 532 is connected to the right input of the multivibrator 572 and the output of the gate 550 is connected to the left input of the multivibrator. The right output of the multivibrator 572 is connected to an input of the gate 530 which has another input connected to the source 544. The output of the gate 530 is introduced to an input of the gate 513 which has another input connected to the tape advance 547.

The left output of the multivibrator 572 is connected to the gate 527 which has an input connected to a manual cross feed 580 for introducing a high input to the gate upon closure of a switch. The manual cross feed 580 is also connected to an input of the gate 509 which has another input connected to the tape advance 547.

Figure 8:
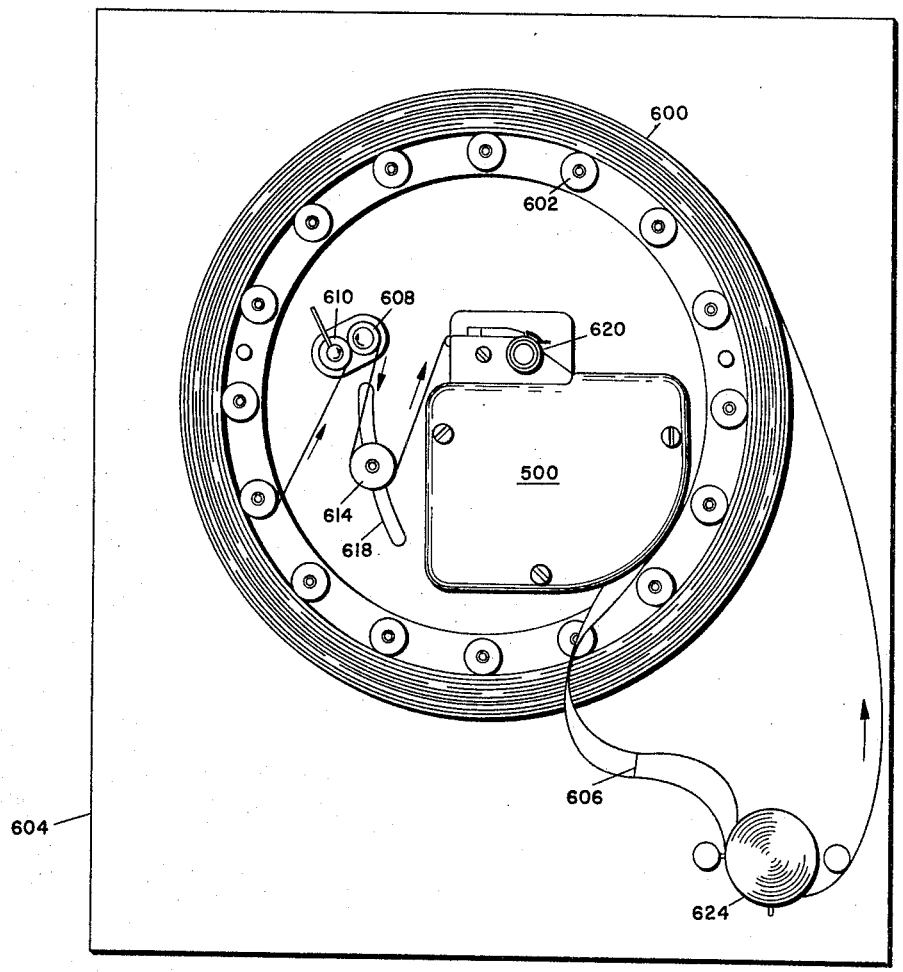
FIGURE 8 shows a tape handling system for feeding tape to the tape reader in FIGURE 7.

A tape handling system for feeding coded tape to the tape reader 500 is shown in FIGURE 8.

A roll of tape 600 is mounted on a plurality of spools 602 which are freely rotatable on a panel 604. The roll of tape forms a closed loop since its opposite ends are spliced as at 606.

After the tape 600 has been mounted on the spools 602, the inner layer of the tape is looped around one of the spools and is inserted between a pair of rollers 608 and 610 having rubbers surfaces to firmly grip the tape. An electric motor (not shown) is mounted behind the panel 604 for driving the rollers 608 and 610. The tape 600 is directed around the roller 608 and is looped around a pulley 614 which is connected to an arm (not shown) provided behind the panel 604. The pulley 614 is freely movable in a slot 618 provided in the panel 604 and moves the arm with it. When the pulley 614 has moved upward a particular distance, the arm connected to it also moves upward to close a switch (not shown) for driving the motor 612 and the rollers 608 and 610.

Figure 9:
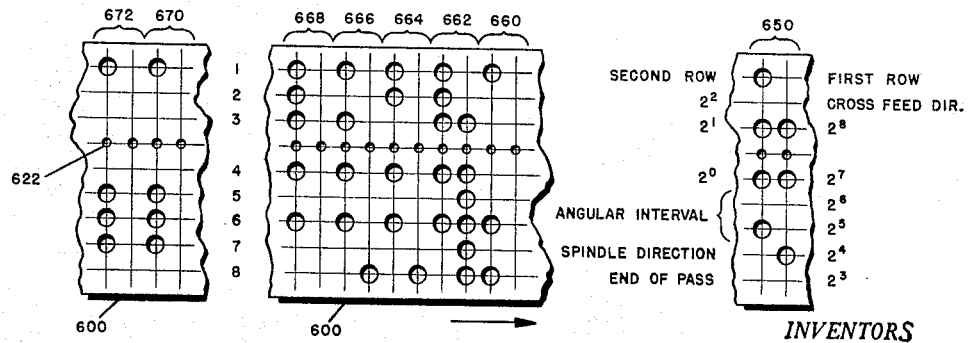
FIGURE 9 is an enlarged view of sections of the tape shown in FIGURE 8.

From the pulley 614, the tape 600 is fed through the tape reader 500 which includes a sprocket wheel 620 to advance the tape when it rotates. The gear teeth on the sprocket wheel 620 engage the tape by extending through the holes 622 in FIGURE 9 which shows enlarged sections of the tape 600. The sprocket 620 rotates a particular angular distance each time that the left output of the multivibrator 501 (FIGURE 7) becomes high. This advances the tape so that the next interval of coded information on the tape may be read by the tape reader 500.

Successive advances of the tape 600 causes the tape between the roller 608 and the sprocket wheel 620 to be taken up and, as a result, the pulley 614 and the arm connected to it are drawn upward until the arm closes the switch to start the electric motor. The motor drives the rollers 608 and 610 to feed tape through the rollers, thus releasing the pulley 614 and the arm for downward movement. When the pulley 614 moves downward, the switch is opened and the electric motor stops rotating until the pulley is again moved upward to close the switch.

During the rotation of the rollers 608 and 610, a force is exerted to rotate the entire roll of tape 600 on the spools 602 in a counterclockwise direction and the section of tape which has passed through the tape reader 500 is taken up on the outside of the roll after passing over a pulley 624.

In the manner disclosed above, the entire length of tape in the roll 600 is advanced through the tape reader 500 until the tape returns to its initial position. The tape is then in position to be passed through the tape reader again.

The tape 600 (FIGURE 9) is provided with information in binary coded form. The presence or absence of a punched hole at a particular position represents certain information of the position. It has been found convenient to utilize two transverse rows to code the intelligence required for each block of information on the tape. For example, the block 650 (FIGURE 9) includes first and second rows of information.

Each row contains eight positions of information which will be designed as positions 1, 2, 3, 4, 5, 6, 7 and 8. In the first row, the absence of a punched hole in position 1 indicates that this is the first row in the block of information. Position 2 represents the cross feed direction and positions 3 to 8, inclusive, represent the presence or absence of the binary digits $2^8$ to $2^3$, inclusive.

In the second row, the presence of a hole in position 1 indicates that this is the second row in the block of information. Positions 2, 3 and 4 represents the presence or absence of binary digits $2^2$, $2^1$ and $2^0$, respectively. Positions 5 and 6 in combination represent the angular interval of spindle rotation to which the digital information is applicable. Position 7 represents the direction of spindle rotation and the presence of a hole at position 8 represents "end of pass" information.

The utilization of the information in blocks 660, 662, 664, 666, 668, 670 and 672 will be disclosed hereafter in connection with the description of the operation of the machine tool.

Figure 10:
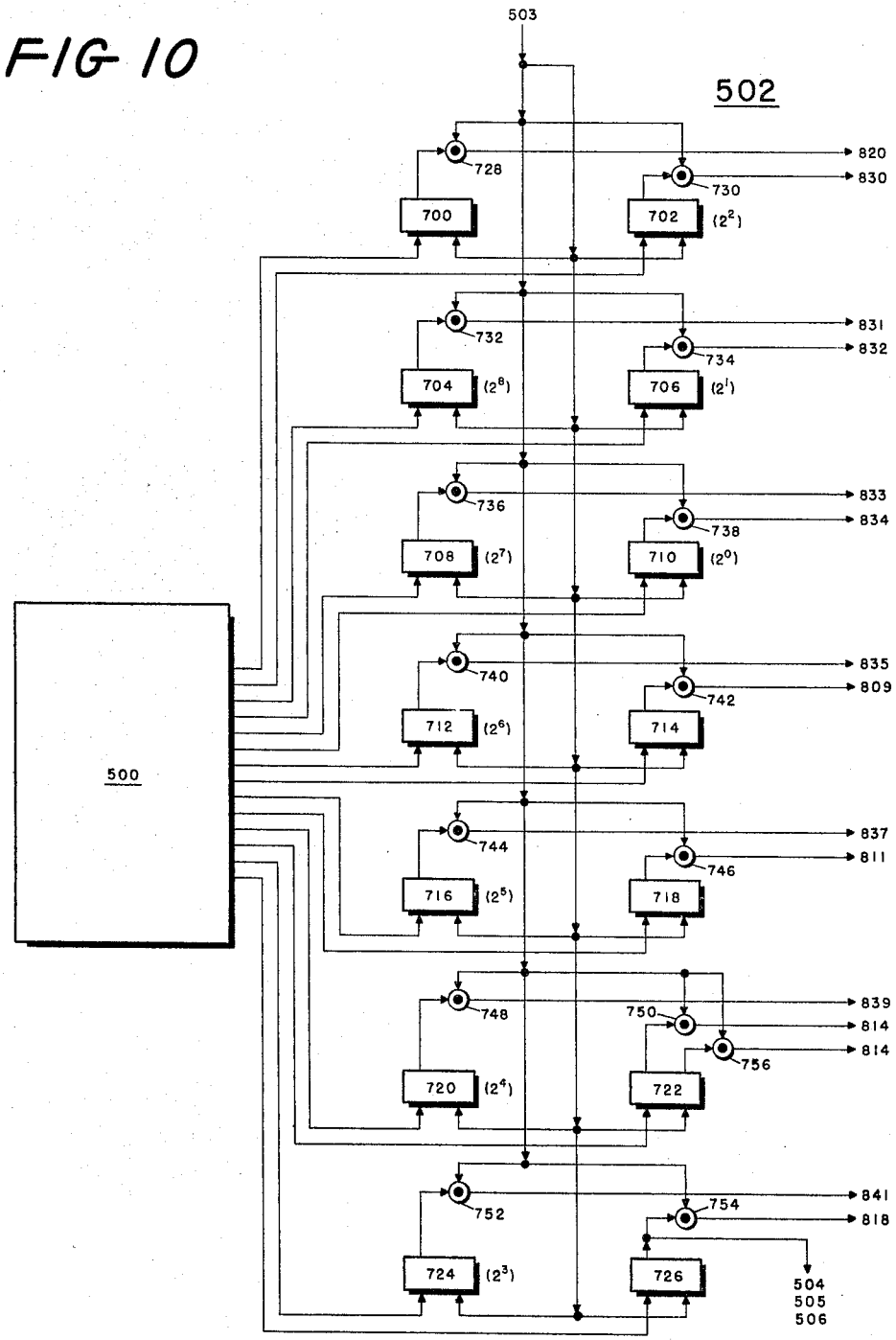

The electronic components included in the temporary storage register 502 are shown in FIGURE 10.

The outputs of the tape reader 500 are connected, respectively, to the left inputs of multivibrators 700, 702, 704, 706, 708, 710, 712, 714, 716, 718, 720, 722, 724 and 726. The left outputs of these multivibrators are connected, respectively, to inputs of gates 728, 730, 732, 734, 736, 738, 740, 742, 744, 746, 748 750, 752 and 754. The left output of the multivibrator 726 is also connected to inputs of gates 504, 505 and 506 in FIGURE 7. The right output of multivibrator 722 is connected to an input of a gate 756.

Other inputs of the gates 728, 730, 732, 734, 736, 738, 740, 742, 744, 746, 748, 750, 752, 754 and 756 are connected to the output of the gate 503 in FIGURE 7. The output of the gate 503 is also connected to the right inputs of the multivibrators in the register 502.

Figure 11:
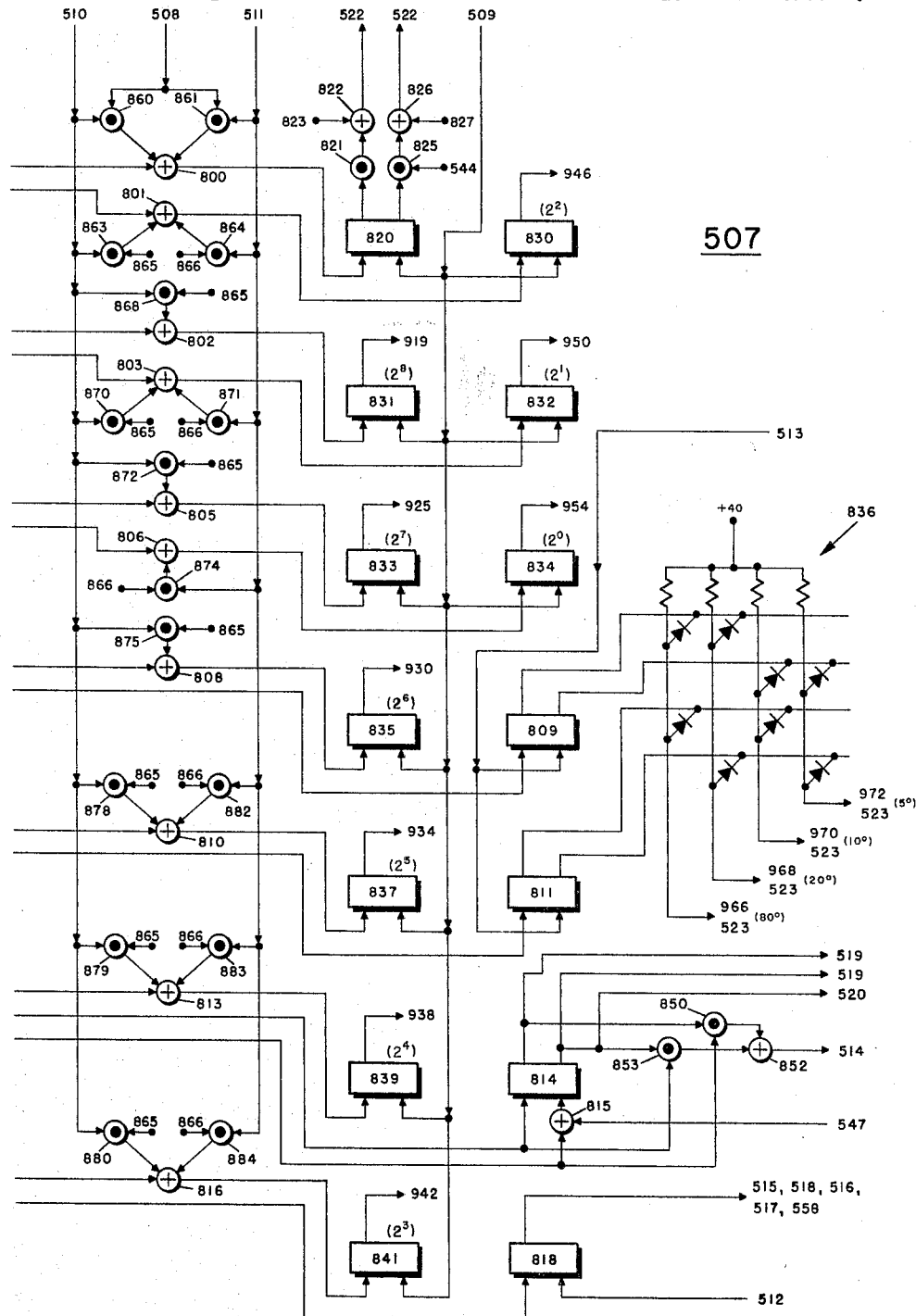

The outputs of the gates 728, 730, 732, 734, 736, 738, 740, 742, 744, 746, 748, 750, 756, 752 and 754 are connected respectively to an input of a gate 800, an input of a gate 801, an input of a gate 802, an input of a gate 803, an input of a gate 805, an input of a gate 806, an input of a gate 808, the left input of a multivibrator 809, the input of a gate 810, the left input of a multivibrator 811, an input of a gate 813, the left input of a multivibrator 814, an input of a gate 815, an input of a gate 816 and the left input of the multivibrator 818, all of which electronic components are included in the active storage register 507 shown in FIGURE 11.

The output of the gate 800 is introduced to the left input of a multivibrator 820. The left output of the multivibrator 820 is connected to an input of a gate 821 which has its output introduced to an input of a gate 822. Another input of the gate 822 is connected to a manual cross feed 823 for introducing a high input to the gate upon the manual closure of a switch. The output of the gate 822 is introduced to an input of the cross feed synchronizer 522 in FIGURE 7. The right output of the gate 820 is introduced to an input of a gate 825 which also has an input connected to the source 544 in FIGURE 7. The output of the gate 825 is connected to an input of a gate 826 which also has an input connected to a manual cross feed 827 for introducing a high input to the gate upon the manual closure of a switch. The output of the gate 826 is introduced to another input of the cross feed synchronizer 522.

The outputs of the gates 801, 802, 803, 805, 806, 808, 810, 813 and 816 are connected, respectively, to the left inputs of multivibrators 830, 831, 832, 833, 834, 835, 837, 839 and 841.

Figure 12:
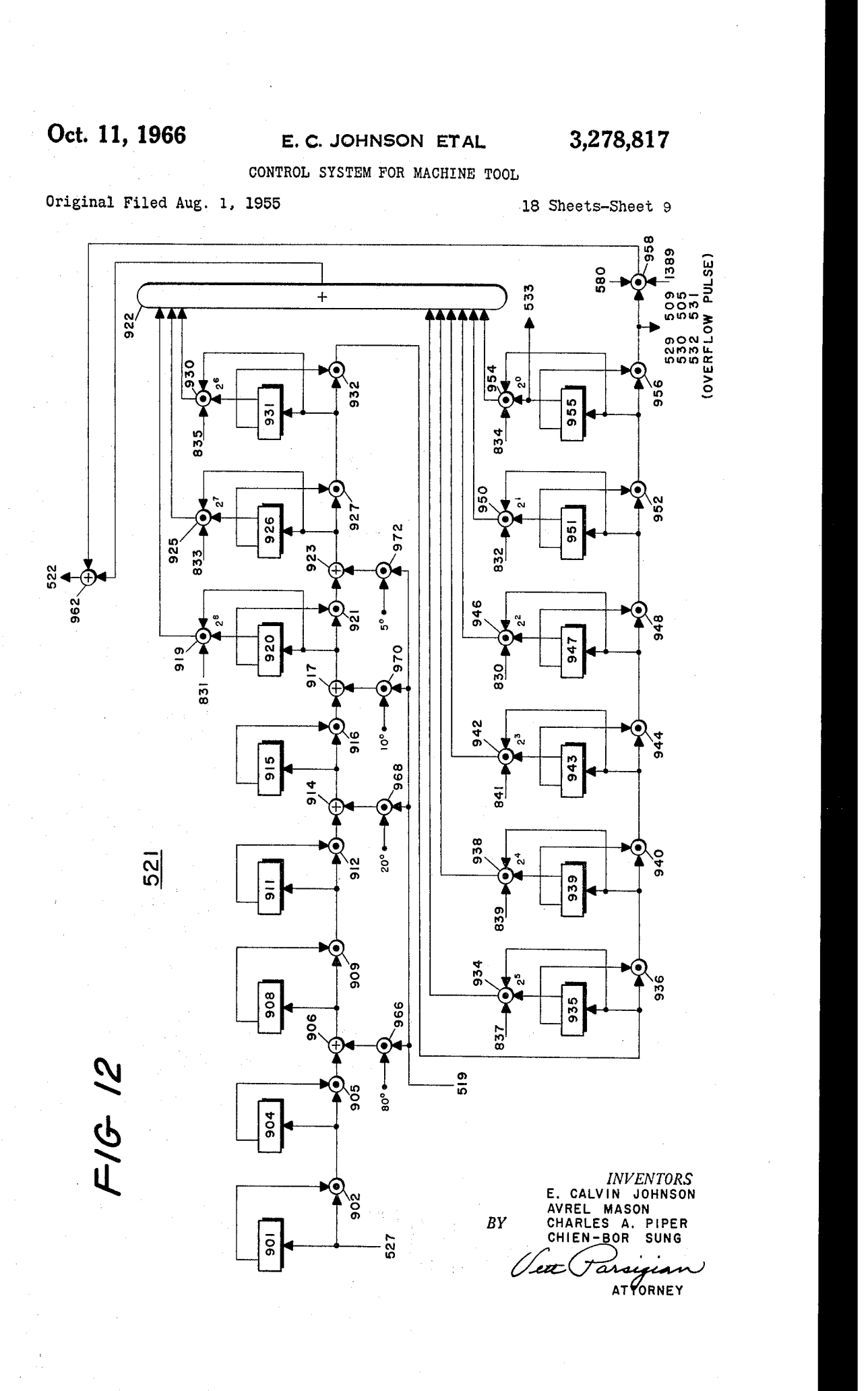

The left outputs of the multivibrators 831, 833, 835, 837, 839, 841, 830, 832, 834 are connected, respectively, to inputs of gates 919, 925, 930, 934, 938, 942, 946, 950 and 954, all of which gates are included in the interpolator 521 shown in FIGURE 12.

The left and right outputs of the multivibrators 809 and 811 are introduced to a decoding circuit generally indicated at 836. The decoder 836 has four outputs connected respectively to inputs of gates 966, 968, 970 and 972 in FIGURE 12. Each output is also connected to inputs of the spindle speed control 523 in FIGURE 5. The condition of the multivibrators 809 and 811 produces a high output at a particular output terminal of the decoder 836.

The high output is introduced to a particular gate in the interpolator 521 and to the grid of a particular tube in the spindle speed control 523. This causes a flow of current through the tube and energizes a relay connected in series with the tube so as to control the output of the servo amplifier 524 for driving the spindle servo 525 at a particular speed. Each output of the decoder 836 actuates a different tube and relay in the control 523 and therefore the servo 525 may be driven at four different speeds depending upon which output of the decoder is high.

The right inputs of the multivibrators 809 and 811 are connected to the output of the gate 513 in FIGURE 7. The left output of the multivibrator 814 is connected to an input of the buffer register 519, to the input of the spindle direction control 520 in FIGURE 7 and to the input of a gate 850 which also has an input connected to the output of the gate 756 in FIGURE 10. The output of the gate 850 is introduced to an input of a gate 852. The right output of the multivibrator 814 is introduced to an input of the buffer register 519 and to an input of a gate 853 which also has an input connected to the output of the gate 750 in FIGURE 10. The output of the gate 853 is introduced to an input of the gate 852 and the output of the gate 852 is introduced to the right input of the multivibrator 514 in FIGURE 7. The right input of the multivibrator 814 is connected to the output of the gate 815 which has an input connected to the source 547 in FIGURE 10.

The left output of the multivibrator 818 is connected to inputs of the gates 515, 518, 516, 517 and 558 in FIGURE 7 and the right input of the multivibrator is connected to the output of the gate 512 in FIGURE 7. The right inputs of the multivibrators 820, 831, 833, 835, 837, 839, 841, 830, 832 and 834 are connected to the output of the gate 509 in FIGURE 7.

The gate 800 has inputs connected to outputs of gates 860 and 861. The gates 860 and 861 have inputs connected to the left output of the multivibrator 508 in FIGURE 7. The gate 801 has inputs connected to the outputs of gates 863 and 864. Inputs of gates 863 and 864 are connected to ganged stepping switches 865 and 866, respectively. The gate 802 has an input connected to the output of the gate 868 which has an input connected to the switch 865.

The gate 803 has inputs connected to the outputs of gates 870 and 871. The gates 870 and 871 have inputs connected to the switches 865 and 866, respectively. The gate 805 has an input connected to the output of the gate 872 which has an input connected to the switch 865. The gate 806 has an input connected to the output of a gate 874 which has an input connected to the switch 866 and the gate 808 has an input connected to a gate 875 which has an input connected to the switch 865. The gates 810, 813 and 816 have inputs connected to outputs of gates 878, 879 and 880, respectively, all of which have inputs connected to the switch 865. The gates 810, 813 and 816 also have inputs connected to the outputs of gates 882, 883 and 884, respectively, all of which have inputs connected to the switch 866.

The switches 865 and 866 may be manually set to provide for the introduction of high inputs to particular ones of the gates which are connected to the switches.

The inputs of the gates 860, 863, 870, 872, 875, 878, 879 and 880 are connected to the output of the gate 510 in FIGURE 10 and the inputs of the gates 861, 864, 874, 882, 883 and 884 are connected to the output of the gate 511 in FIGURE 7.

The electronic components included in the interpolator 521 are shown in FIGURE 12.

The input of a multivibrator 901 and the input of a gate 902 are connected to the output of the gate 527 in FIGURE 7. The left output of the multivibrator 901 is connected to another input of the gate 902. The output of the gate 902 is connected to the input of a multivibrator 904 and to an input of a gate 905. The left output of the multivibrator 904 is connected to another input of the gate 905. The output of the gate 905 is introduced to an input of a gate 906 having its output connected to the input of a multivibrator 908 and to an input of a gate 909. The left output of the multivibrator 908 is connected to another input of the gate 909.

The output of the gate 909 is introduced to the input of a multivibrator 911 and to an input of a gate 912. The left output of the multivibrator 911 is also introduced to an input of the gate 912. The output of the gate 912 is connected to an input of the gate 914 having its output connected to the input of a multivibrator 915 and to an input of a gate 916. The left output of the multivibrator 915 is also connected to an input of the gate 916. The output of the gate 916 is connected to an input of a gate 917.

The output of the gate 917 is connected to an input of a gate 919, to the input of a mutlivibrator 920 and to an input of a gate 921. The right output of the multivibrator 920 is connected to an input of the gate 919 and another input of the gate 919 is connected to the output of the multivibrator 831 in FIGURE 11. The output of the gate 919 is connected to an input of a gate 922. The left output of the multivibrator 920 is connected to an input of the gate 921 which has its output connected to an input of a gate 923.

The output of the gate 923 is connected to an input of a gate 925, to the input of a multivibrator 926 and to an input of a gate 927. The right output of the multivibrator 926 is connected to an input of the gate 925 and another input of the gate 925 is connected to the output of the multivibrator 833 in FIGURE 11. The output of the gate 925 is connected to an input of the gate 922. The left output of the multivibrator 926 is connected to an input of the gate 927.

The output of the gate 927 is introduced to an input of a gate 930, to an input of a multivibrator 931 and to the input of a gate 932. The right output of the multivibrator 931 is connected to an input of the gate 930 and another input of the gate 930 is connected to the output of the multivibrator 835 in FIGURE 11. The output of the gate 930 is introduced to an input of the gate 922. The left output of the multivibrator 931 is introduced to an input of the gate 932.

The output of the gate 932 is introduced to an input of the gate 934, to the input of a multivibrator 935 and to an input of a gate 936. The right output of the multivibrator 935 is connected to an input of the gate 934 which has another input connected to the output of the multivibrator 837 in FIGURE 11. The output of the gate 934 is connected to an input of the gate 922. The left output of the multivibrator 935 is connected to an input of the gate 936.

The output of the gate 936 is introduced to an input of a gate 938, to the input of a multivibrator 939 and to an input of a gate 940. The right output of the multivibrator 939 is introduced to an input of the gate 938 which has another input connected to the output of the multivibrator 839 in FIGURE 11. The output of the gate 938 is connected to an input of the gate 922. The left output of the multivibrator 939 is connected to an input of the gate 940.

The output of the gate 940 is introduced to an input of a gate 942, to the input of a multivibrator 943 and to an input of a gate 944. The right output of the multivibrator 943 is introduced to an input of the gate 942 having another input connected to the left output of the multivibrator 841 in FIGURE 11. The output of the gate 942 is introduced to an input of the gate 922. The left output of the multivibrator 943 is introduced to an input of the gate 944.

The output of the gate 944 is introduced to an input of the gate 946, to the input of a multivibrator 947 and to an input of a gate 948. The right output of the multivibrator 947 is introduced to an input of the gate 946 having another input connected to the left output of the multivibrator 830 in FIGURE 11. The output of the gate 946 is introduced to an input of the gate 922. The left output of the multivibrator 947 is connected to an input of the gate 948.

The output of the gate 948 is connected to an input of a gate 950, to the input of a multivibrator 951 and to an input of a gate 952. The right output of the multivibrator 951 is introduced to an input of the gate 950 having another input connected to the left output of the multivibrator 832 in FIGURE 11. The output of the gate 950 is introduced to an input of the gate 922. The left output of the multivibrator 951 is introduced to an input of the gate 952.

The output of the gate 952 is introduced to an input of a gate 954, to the input of a multivibrator 955 and to an input of a gate 956. The right output of the multivibrator 955 is connected to an input of the gate 533 in FIGURE 7 and is also connected to an input of the gate 954. Another input of the gate 954 is connected to the left output of the multivibrator 834 in FIGURE 11. The output of the gate 954 is connected to an input of the gate 922. The left output of the multivibrator 955 is connected to an input of the gate 956.

The output of the gate 956 which may be referred to as the "overflow" of the interpolator 521 is connected to inputs of gates 529, 530, 532, 509, 505 and 531 in FIGURE 7. The output of the gate 956 is also connected to an input of a gate 953. The gate 958 has another input connected to the right output of the multivibrator 1389 in FIGURE 16. Still another input of the gate 958 is connected to the manual cross feed 580 in FIGURE 7. The output of the gate 958 is connected to an input of a gate 962 which has its outer input connected to the output of the gate 922. The output of the gate 962 is introduced to the cross feed synchronizer 522 in FIGURE 7.

Inputs of the gates 966, 968, 970 and 972 are connected to an output of the buffer register 519 in FIGURE 7. Other inputs of the gates 966, 968, 970 and 972 are connected to different output terminals of the decoder 836 in FIGURE 11. The outputs of the gates 966, 968, 970 and 972 are connected, respectively, to inputs of the gates 906, 914, 917 and 923.

The electronic components included in the spindle pulse synchronizer 539 are shown in FIGURE 13.

The left and right inputs of a Schmitt trigger 1000 are connected to outputs of the demodulator 534 in FIGURE 7. A Schmitt trigger has an operation similar to a multivibrator in that it has two states of operation. With a particular bias imposed on a first input of the trigger, the trigger will operate with its output high until the voltage applied to a second input of the trigger exceeds a particular value. When this occurs the second output becomes high and the first output becomes low. The trigger will remain in this condition until the voltage applied to the second input falls below the particular value. For example, the Schmitt trigger 1000 has a bias on its right input and it initially operates with its right output high and its left output low. When a voltage is applied to the left input of the trigger 1000, its left output will become high and its right output will become low when the voltage exceeds a particular value. As soon as the voltage applied to the left input of the trigger falls below the particular value, the trigger returns to its initial condition.

The left output of the Schmitt trigger 1000 is connected to an input of a gate 1002 which has its ouput connected to a mulitvibraor 1004. The right output of the trigger 1000 is connected to the input of a gate 1006 which has its output connected to the right input of the multivibrator 1004. The left output of the multivibrator 1004 is connected to an input of a gate 1008 and to an input of a gate 1010. The right output of the multivibrator 1004 is connected to an input of a gate 1012 and to an input of a gate 1014.

A Schmitt trigger 1016 which operates in the same manner as the trigger 1000 has its left and right inputs connected to the other outputs of the demodulator 534. The left output of the trigger 1016 is connected to an input of the gate 1008 and to an input of the gate 1014. The right output of the trigger 1016 is introduced to an input of the gate 1012 and to an input of the gate 1010.

The outputs of the gates 1008 and 1012 are introduced to a gate 1018. The output of the gate 1018 is introduced to the left input of a multivibrator 1020. The right output of the multivibrator 1020 is connected to inputs of the gates 1010, 1014, 1012 and 1008. The left output of the multivibrator 1020 is connected to an input of a gate 1022 and to an input of a gate 1024 which has its output connected to the right input of the multivibrator. The left output of the multivibrator 1020 is also introduced to an input of the buffer register 519 in FIGURE 7.

The outputs of the gates 1014 and 1010 are introduced to inputs of a gate 1026. The output of the gate 1026 is introduced to the left input of a multivibrator 1028. The right output of the multivibrator 1028 is connected to inputs of the gates 1010, 1014, 1012 and 1008. The left output of the multivibrator 1028 is introduced to an input of the gate 1022 and to an input of a gate 1030 which has its output connected to the right input of the multivibrator. The left output of the multivibrator 1028 is connected to another input of the buffer register 519.

The output of the gate 1022 is introduced to the input of a multivibrator 1032. The left output of the multivibrator 1032 is introduced to inputs of the gates 1012 and 1010 and the right output of the multivibrator is introduced to inputs of the gates 1008 and 1014.

Figure 14:
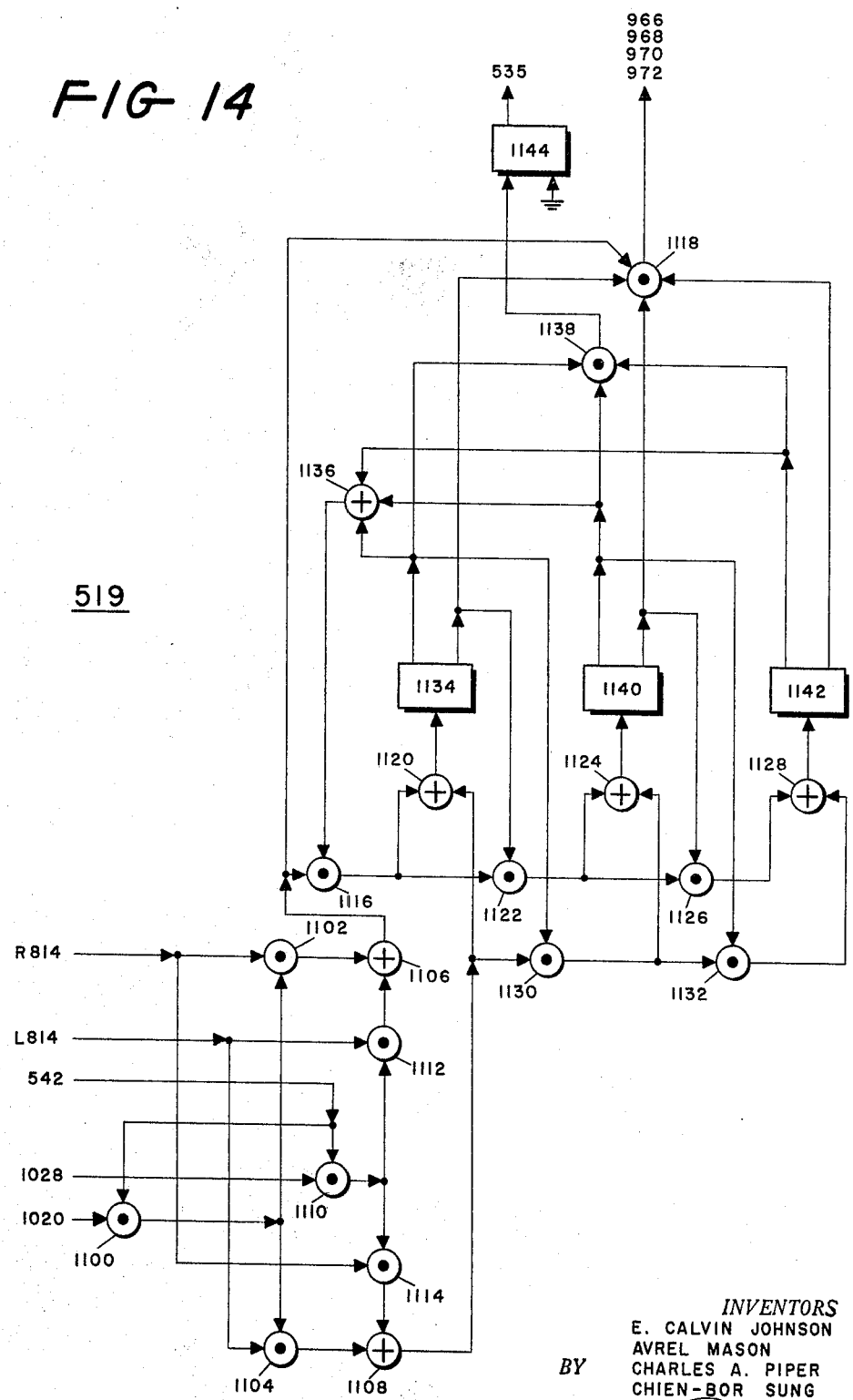

The electronic components included in the buffer register 519 are shown in FIGURE 14.

A gate 1100 has an input connected to the left output of the multivibrator 1020 in FIGURE 13. Another input of the gate 1100 is connected to the output of the gate 542 in FIGURE 7. The output of the gate 1100 is introduced to inputs of gates 1102 and 1104. Another input of the gate 1102 is connected to the left output of the multivibrator 814 in FIGURE 11. The output of the gate 1102 is introduced to an input of a gate 1106. Another input of the gate 1104 is connected to the right output of the multivibrator 814 in FIGURE 11. The output of the gate 1104 is introduced to an input of a gate 1108.

A gate 1110 has an input connected to the left output of the multivibrator 1028 in FIGURE 13. Another input of the gate 1110 is connected to the output of the gate 542 in FIGURE 7. The output of the gate 1110 is introduced to inputs of gates 1112 and 1114. The other inputs of the gates 1112 and 1114 are connected to the right and left outputs of the multivibrator 814 (FIGURES 11), respectively. The output of the gate 1112 is introduced to an input of the gate 1106 and the output of the gate 1114 is introduced to an input of the gate 1108.

The output of the gate 1106 is introduced to an input of a gate 1116 and to an input of a gate 1118. The output of the gate 1116 is introduced to an input of a gate 1120 and to an input of a gate 1122. The output of the gate 1122 is introduced to an input of a gate 1124 and to an input of a gate 1126 which has its output connected to an input of a gate 1128.

The output of the gate 1108 is introduced to the input of a multivibrator 1134. The right output of the multivibrator 1134 is introduced to an input of the gate 1118 and to an input of the gate 1122. The left of the multivibrator 1134 is introduced to an input of a gate 1136 and to an input of a gate 1138.

The output of the gate 1124 is introduced to an input of a multivibrator 1140. The left of the multivibrator 1140 is introduced to an input of the gate 1136, to an input of the gate 1138 and to an input of the gate 1132. The right output of the multivibrator 1140 is introduced to an input of the gate 1118 and to an input of the gate 1126.

The output of the gate 1128 is introduced to a multivibrator 1142. The left output of the multivibrator is introduced to an input of the gate 1136 and to an input of the gate 1138. The right output of the multivibrator is introduced to an input of the gate 1118. The output of the gate 1136 is introduced to an input of the gate 1116.

The output of the gate 1138 is introduced to the left input of a multivibrator 1144. The right input of the multivibrator 1144 is grounded and its left output is introduced to an input of the gate 535 in FIGURE 7. The output of the gate 1118 is introduced to inputs of the gates 966, 968, 970 and 972 of the interpolator 521 in FIGURE 12.

Figure 15:
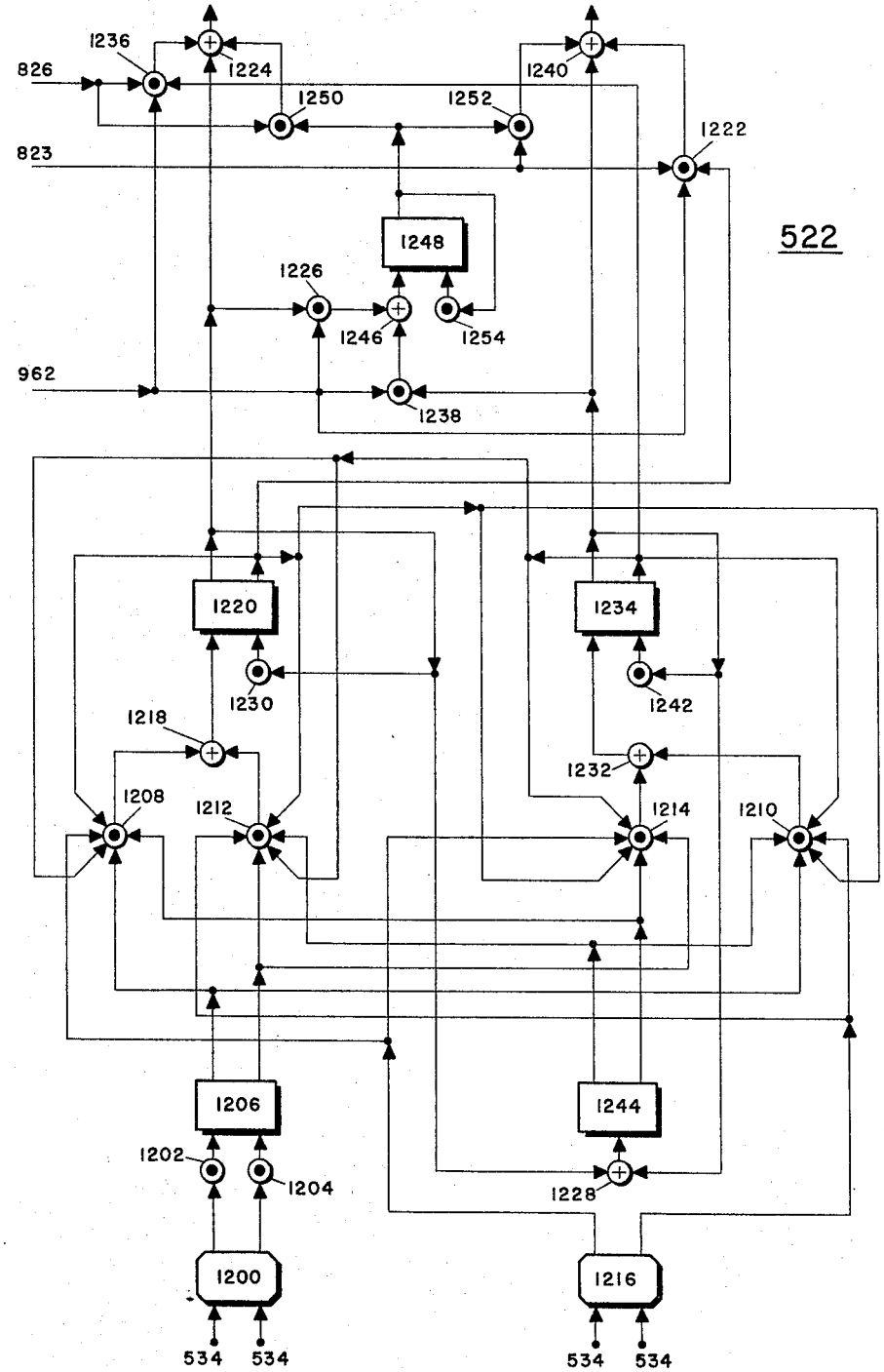

The electronic components included in the cross feed synchronizer 522 are shown in FIGURE 15.

A Schmitt trigger 1200 which operates in the same manner as the Schmitt trigger 1000 in the spindle pulse synchronizer 539, has its left and right inputs connected to outputs of the demodulator 534 in FIGURE 7. The left output of the trigger 1200 is introduced to an input of a gate 1202 and the right output of the multivibrator is introduced to an input of a gate 1204. The outputs of the gates 1202 and 1204 are introduced, respectively, to the left and right inputs of a multivibrator 1206. The left output of the multivibrator 1206 is introduced to an input of a gate 1208 and to an input of a gate 1210 and the right output of the multivibrator is introduced to an input of a gate 1212 and to an input of a gate 1214.

A Schmitt trigger 1216 also has its left and right inputs connected to outputs of the demodulator 534. The left output of the trigger 1216 is introduced to an input of the gate 1208 and to an input of the gate 1214 and the right output of the trigger is introduced to an input of the gate 1212 and to an input of the gate 1210.

The outputs of the gates 1208 and 1212 are introduced to inputs of a gate 1218. The output of the gate 1218 is introduced to the left input of a multivibrator 1220. The right output of the multivibrator 1220 is connected to an input of the gate 1208, to an input of a gate 1222, to an input of the gate 1210, to an input of the gate 1214 and to an input of the gate 1212. The left output of the multivibrator 1220 is connected to an input of a gate 1224, to an input of a gate 1226, to an input of a gate 1228 and to an input of a gate 1230 which has its output connected to the right input of the multivibrator.

The outputs of the gates 1214 and 1210 are introduced to inputs of a gate 1223. The output of the gate 1232 is introduced to the left input of a multivibrator 1234. The right output of the multivibrator 1234 is connected to an input of the gate 1214, to an input of the gate 1212, to an input of the gate 1208, to an input of a gate 1236 and to an input of the gate 1210. The left output of the multivibrator 1234 is introduced to an input of a gate 1238, to an input of a gate 1240, to an input of the gate 1228 and to an input of a gate 1242 having its output connected to the right input of the multivibrator.

The output of the gate 1228 is introduced to the input of a multivibrator 1244 which has its left output connected to inputs of the gates 1212 and 1210 and has its right output connected to inputs of the gates 1208 and 1214. The inputs of the gates 1236, 1226, 1238 and 1222 are connected to the output of the gate 962 in the interpolator 521 in FIGURE 12.

The outputs of the gates 1226 and 1238 are introduced to an input of a gate 1246 which has its output introduced to the left input of a multivibrator 1248. The left output of the multivibrator is introduced to an input of a gate 1250, to an input of the gate 1252 and to an input of a gate 1254 which has its output connected to the right input of the multivibrator.

Inputs of the gates 1236 and 1250 are connected to the output of the gate 826 of the active storage register 507 in FIGURE 11. The outputs of the gates 1236 and 1250 are introduced to inputs of the gate 1224. Inputs of the gates 1252 and 1222 are connected to the output of the gate 823 of the active storage register 507 in FIGURE 11. The outputs of the gates 1252 and 1222 are introduced to inputs of the gate 1240. The outputs of the gates 1224 and 1240 are introduced to inputs of the error register 528 in FIGURE 7.

Figure 16:
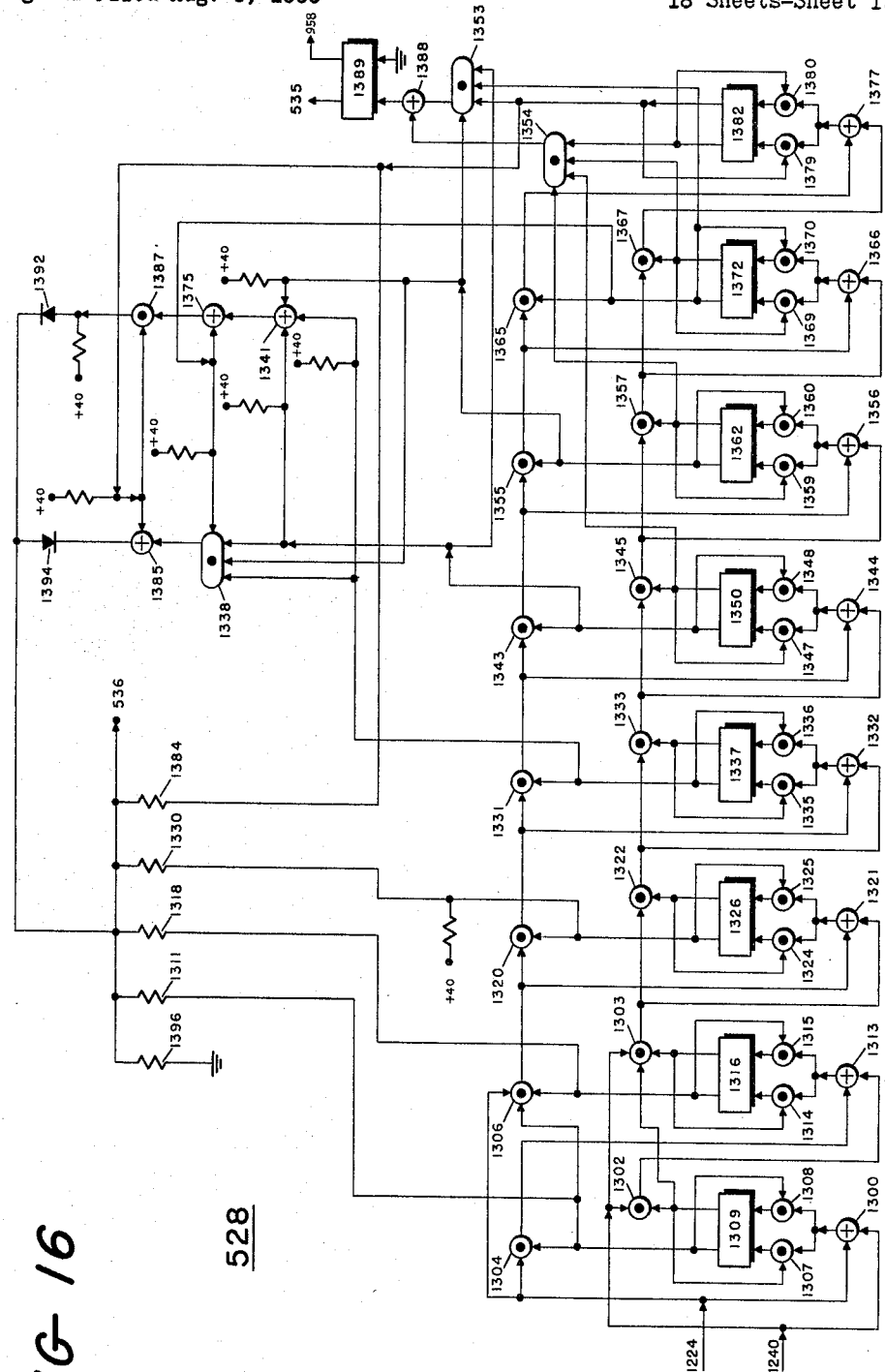

The electronic components included in the error register 528 are shown in FIGURE 16.

Inputs of gates 1300, 1302 and 1303 are connected to the output of the gate 1224 of the cross feed synchronizer 522 in FIGURE 15. Inputs of the gate 1300 and inputs of gates 1304 and 1306 are connected to the output of the gate 1240 of the cross feed synchronizer 522 in FIGURE 15.

The output of the gate 1300 is introduced to inputs of gates 1307 and 1308. The outputs of the gates 1307 and 1308 are introduced, respectively, to the left and right inputs of a multivibrator 1309. The left output of the multivibrator 1309 is introduced to an input of the gate 1304, to the input of the servo amplifier 536 (FIGURE 5) through a resistance 1311, to an input of the gate 1306 and to an input of the gate 1308. The right output of the multivibrator 1309 is introduced to an input of the gate 1307, to an input of the gate 1302 and to an input of the gate 1303.

The outputs of the gates 1304 and 1302 are introduced to inputs of a gate 1313. The output of the gate 1313 is introduced to inputs of gates 1314 and 1315 which have their outputs introduced, respectively, to the left and right inputs of a multivibrator 1316. The left output of the multivibrator 1316 is introduced to an input of the gate 1306, to the servo amplifier 536 through a resistance 1318 and to an input of the gate 1315. The right output of the multivibrator 1316 is introduced to an input of the gate 1314 and to an input of the gate 1303.

The output of the gate 1306 is introduced to an input of a gate 1320 and to an input of a gate 1321. The output of the gate 1303 is introduced to an input of a gate 1322 and to an input of the gate 1321. The output of the gate 1321 is introduced to inputs of gates 1324 and 1325 which have their outputs connected, respectively, to the left and right inputs of a multivibrator 1326. The left output of the multivibrator 1326 is introduced to an input of the gate 1320, to the servo amplifier 536 through a resistance 1330 and to an input of the gate 1325. The right output of the multivibrator 1326 is introduced to an input of the gate 1324 and to an input of the gate 1322.

The output of the gate 1320 is introduced to an input of a gate 1331 and to an input of a gate 1332. The output of the gate 1322 is introduced to an input of a gate 1333 and to an input of the gate 1332. The output of the gate 1332 is introduced to inputs of gates 1335 and 1336 which have their outputs connected, respectively, to the left and right inputs of a multivibrator 1337. The left output of the multivibrator 1337 is introduced to an input of the gate 1331, to an input of a gate 1338, to an input of a gate 1341 and to an input of the gate 1336. The right output of the multivibrator 1337 is introduced to an input of the gate 1335 and to an input of the gate 1333.

The output of the gate 1331 is introduced to an input of a gate 1343 and to an input of a gate 1344. The output of the gate 1333 is introduced to an input of a gate 1345 and to an input of the gate 1344. The output of the gate 1344 is introduced to inputs of gates 1347 and 1348 which have their outputs connected, respectively, to the left and right inputs of a multivibrator 1350. The left output of the multivibrator is connected to an input of the gate 1343, to an input of the gate 1338, to an input of the gate 1341, to an input of a gate 1353 and to an input of the gate 1348. The right output of the multivibrator 1350 is introduced to an input of the gate 1347, to an input of the gate 1345 and to an input of a gate 1354.

The output of the gate 1343 is introduced to an input of a gate 1355 and to an input of a gate 1356. The output of the gate 1345 is introduced to an input of a gate 1357 and to an input of the gate 1356. The output of the gate 1356 is introduced to inputs of gates 1359 and 1360 which have their outputs connected, respectively, to the left and right inputs of a multivibrator 1362. The left output of the multivibrator 1362 is connected to an input of the gate 1355, to an input of the gate 1338, to an input of the gate 1341, to an input of the gate 1353 and to an input of the gate 1360. The right output of the multivibrator 1362 is introduced to an input of the gate 1359, to an input of the gate 1357 and to an input of the gate 1354.

The output of the gate 1355 is introduced to an input of a gate 1365 and to an input of a gate 1366. The output of the gate 1357 is introduced to an input of a gate 1367 and to an input of the gate 1366. The output of the gate 1366 is introduced to inputs of gates 1369 and 1370 which have their outputs connected, respectively, to the left and right inputs of a multivibrator 1372. The left output of the multivibrator 1372 is connected to an input of the gate 1365, to an input of the gate 1338, to an input of a gate 1375 and to an input of the gate 1370. The right output of the multivibrator 1372 is introduced to an input of the gate 1369, to an input of the gate 1367 and to an input of the gate 1354.

The outputs of the gates 1365 and 1367 are introduced to inputs of a gate 1377. The output of the gate 1377 is introduced to inputs of gates 1379 and 1380 which have their outputs introduced, respectively, to the left and right inputs of a multivibrator 1382. The left output of the multivibrator 1382 is introduced to an input of of the gate 1354 and to an input of the gate 1380. The right output of the multivibrator 1382 is introduced to an input of the gate 1379, to the servo amplifier 536 through a resistance 1384, to an input of a gate 1385, to an input of a gate 1387 and to an input of the gate 1353.

The output of the gates 1354 and 1355 are introduced to inputs of a gate 1388 which has its output introduced to the left input of a multivibrator 1389. The left output of the multivibrator 1389 is introduced to an input of the gate 535 in FIGURE 7. The right output of the multivibrator 1389 is introduced to an input of the gate 958 of the interpolator 521 in FIGURE 12.

The output of the gate 1341 is introduced to an input of the gate 1375 which has its output connected to an input of the gate 1387. The output of the gate 1387 is connected to the servo amplifier 536 through a diode 1392. The output of the gate 1338 is introduced to an input of the gate 1385 which has its output introduced to the servo amplifier 536 through a diode 1394. The servo amplifier 536 is connected to ground through a resistance 1396.

Figure 17:
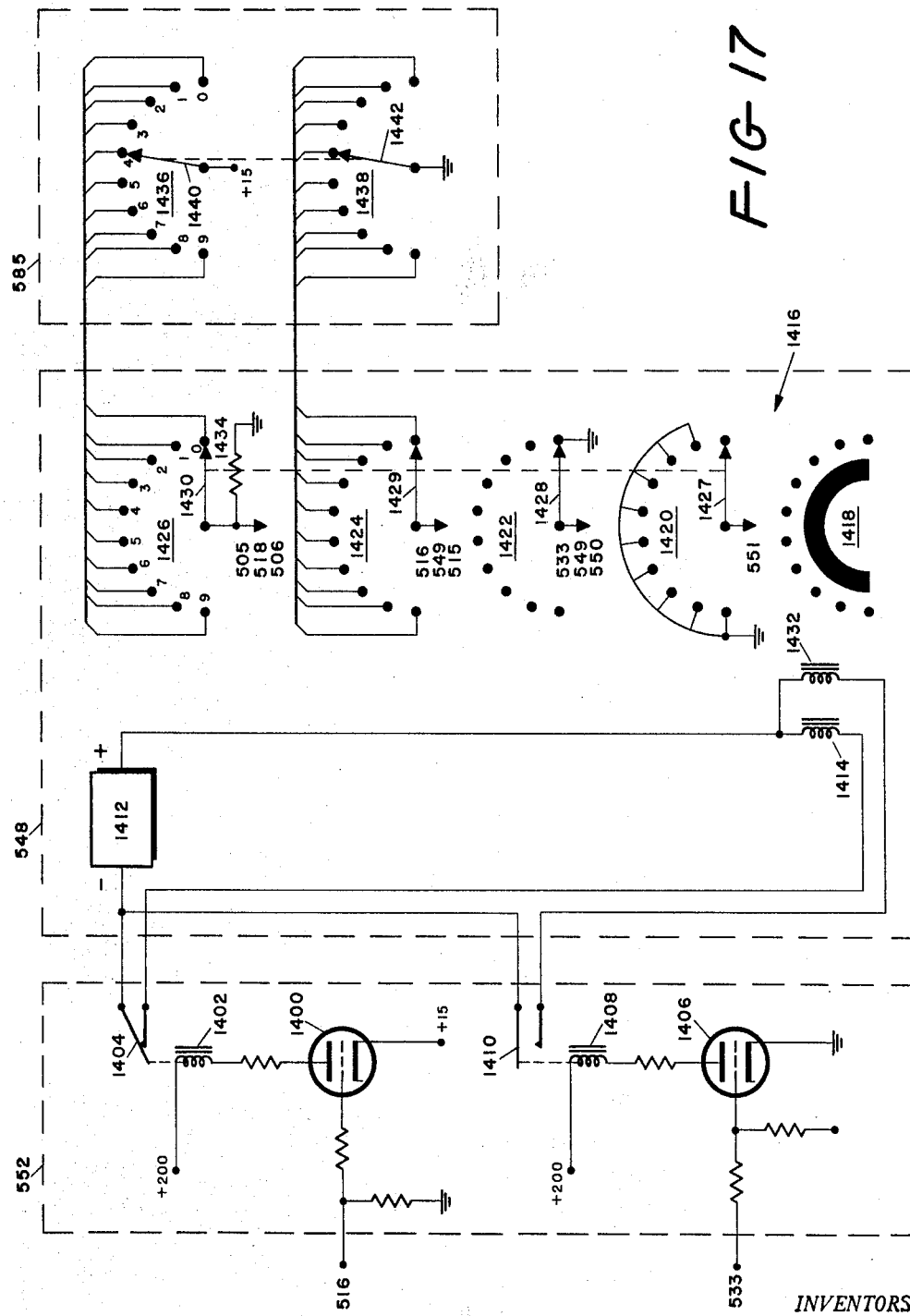

The components included in the pass counter control 552, the pass counter 548 and the number of passes required control 585 are shown in FIGURE 17.

The output of the gate 516 in FIGURE 7 is introduced to the grid of a tube 1400 which is normally biased below cut-off. A relay generally indicated at 1402 is connected into the plate circuit of the tube 1400 so as to produce a closure of the relay switch 1404 upon a flow of current through the tube 1400. Similarly, the output of the gate 533 in FIGURE 7 is introduced to the grid of the tube 1406 which is normally biased below cut-off. A relay generally indicated at 1408 is connected in the plate circuit of the tube 1406 so as to produce a closure of the relay switch 1410 upon a flow of current through the tube 1406.

The switch 1404 is connected in series with a power supply 1412 and a positive solenoid 1414 of a ganged stepping switch generally indicated at 1416. The stepping switch 1416 includes the stepping mechanism 1418 and switching units 1420, 1422, 1424 and 1426. Each closure of the switch 1404 will produce an energization of the solenoid 1414 so as to advance the switch 1416 one position in the positive direction. For example, a closure of the switch 1404 will energize the solenoid 1414 to advance the stepping mechanism 1418 so that the arms 1427, 1428, 1429 and 1430 in the switching units 1420, 1422, 1424 and 1426 will advance one position from the "zero" terminal to the "one" terminal.

The switch 1410 is connected in series with the power supply 1412 and the negative solenoid 1432 of the ganged stepping switch 1416. Each energization of the solenoid 1432 will cause the switch 1416 to move one position in a clockwise direction. For example, the energization of the solenoid 1432 will cause the arms 1427, 1428, 1429 and 1430 to move from the number "one" position to the "zero" position.

The arm 1427 in the switching unit 1420 is connected to an input of the gate 551 in FIGURE 7. The arm 1428 in the switching unit 1422 is connected to inputs of gates 533, 549 and 550 in FIGURE 7. The arm 1429 in the switching unit 1424 is connected to inputs of gates 516, 549 and 550 in FIGURE 7. The arm 1430 in the switching unit 1426 is connected to ground through a resistance 1434 and is also connected to inputs of gates 505, 518 and 506 in FIGURE 7.

The terminals in the switching unit 1426 are connected to corresponding terminals in a manual switch 1436 and the terminals in the switching unit 1424 are connected to corresponding terminals in a manual switch 1438. An arm 1440 in the switch 1436 is connected to a source of voltage and is mechanically coupled to an arm 1442 in the switch 1438. The arms 1440 and 1442 may be manually positioned in contact with corresponding terminals in the switches 1436 and 1438. For example, the arms 1440 and 1442 are shown in contact with terminals number 4 in the switches. This indicates that a total number of 4 passes will be made by the cutting tool over a workpiece to produce a cam having the desired contour as will be subsequently disclosed.

Generally indicated at 1500 in FIGURE 18 is a two input bistable multivibrator, such as may be used in the machine tool system.

The multivibrator 1500 includes a left tube 1502 and a right tube 1504. The plate of the tube 1502 is connected to a left output terminal 1506 through a resistance 1508 and the plate of the tube 1504 is connected to the right output terminal 1510 hrough a resistance 1512. The resistances 1508 and 1512 are connected to a suitable source of positive voltage through resistances 1514 and 1516, respectively.

The output terminal 1506 is connected between the resistances 1508 and 1514 and is also connected between a pair of diodes 1518 and 1520 which are connected in series between a suitable source of positive voltage and ground. Similarly, the output terminal 1510 is connected between the resistances 1512 and 1516 and between a pair of diodes 1522 and 1524 which are connected in series between the suitable source of positive voltage and ground.

The grid of the tube 1502 is connected to the left input terminal 1526 through a resistance 1528, a capacitance 1529 and a resistance 1530. The grid of the tube 1502 is also connected to a suitable source of negative voltage through the resistance 1528, a resistance 1531 and a resistance 1532. A circuit including a switch 1534 is connected in parallel with the resistance 1532. The switch 1534 is normally closed to by-pass the resistance 1532. The grid of the tube 1502 is also connected to the plate of the tube 1504 through the resistance 1528 and an R-C circuit including a resistance 1536 and a capacitance 1537.

The grid of the tube 1504 is connected to the right input terminal 1538 through a resistance 1540, a capacitance 1541 and a resistance 1542. The grid is also connected to the suitable source of negative voltage through the resistance 1540 and a resistance 1543 and to the plate of the tube 1502 through the resistance 1540 and an R-C circuit including a resistance 1544 and a capacitance 1545.

The cathode of the tube 1502 is connected to the cathode of the tube 1504 and is connected to ground through resistances 1548, 1549 and 1550. The cathode of the tube 1504 is connected to ground through a capacitance 1552, a resistance 1553 and a resistance 1554.

A pair of diodes 1560 and 1561 are connected in series between terminals of the resistances 1530 and 1542. A terminal 1562 is connected to a terminal between the diodes 1560 and 1561. Clock pulses at a relatively high frequency rate are introduced to the terminal 1562. The clock pulses may be produced by a suitable source, such as an oscillator, and may have a relatively high frequency rate such as 50,000 pulses per second. Clock pulses are shown in waveform G of FIGURE 19.

Prior to the application of power to the multivibrator 1500, the switch 1534 is opened so that the resistance 1532 is not by-passed. When the power is applied, the left tube 1502 becomes conductive and the right tube 1504 remains non-conductive. This occurs because the multivibrator 1500 actually becomes a mono-stable multivibrator when the resistance 1532 is connected in series with the resistance 1531, the stable state providing for a conduction through the left tube 1502. Shortly after the application of the power to the multivibrator 1500, the switch 1534 is closed to by-pass the resistance 1532 for balancing the multivibrator circuit so as to make it a bistable multivibrator.

In this initial state of operation, the right output terminal 1510 is high as shown by the waveform K in FIGURE 19 and the left output terminal 1506 is low as shown by the waveform I. The multivibrator 1500 continues to operate in this condition until a high input is introduced to the left input terminal 1526. The input to the terminal 1526 is shown by the waveform H in FIGURE 19. It will be noted that the output at the terminal 1506 will become high as at 1564 upon the first clock fall 1565 occurring after the input to the terminal 1526 becomes high as shown at 1566. At the same time that the output terminal 1506 becomes high at 1564, the output at the terminal 1510 becomes low as shown a 1567 in waveform K.

The multivibrator will continue to operate in this condition even though the input to the terminal 1526 becomes low as shown at 1570 in waveform H. When the input to the terminal 1538 becomes high as shown at 1572 in waveform J, the multivibrator will change its state of operation upon the next occurring clock fall 1574. Upon the clock fall 1574 the left output terminal 1506 will become low as shown at 1575 in waveform I and at the same time the right output terminal 1510 will become high as shown at 1576 in waveform K. The multivibrator 1500 will continue to operate in this condition until a high input is again introduced to the left input terminal 1526. The two input bistable multivibrators shown throughout the machine tool system operate in the manner disclosed above to make the left output terminal 1506 high when the left input terminal 1526 becomes high and to make the right output terminal 1510 high when the right input terminal 1538 becomes high.

Generally indicated at 1600 in FIGURE 20 is a one input bistable multivibrator such as may be used in the machine tool system.

The multivibrator 1600 includes a left tube 1602 and a right tube 1604. The plate of the left tube 1602 is connected to a left output terminal 1606 through a resistance 1608 and the plate of the tube 1604 is connected to a right output terminal 1610 through a resistance 1612. The resistances 1608 and 1612 are connected to a suitable source of positive voltage through resistances 1614 and 1616, respectively.

The output terminal 1606 is connected to a terminal between the resistances 1614 and 1608 and is also connected to a terminal between a pair of diodes 1618 and 1620 which are connected in series between ground and a suitable source of positive voltage. Similarly, the output terminal 1610 is connected to a terminal between the resistances 1616 and 1612 and between a pair of diodes 1622 and 1624 which are in series between ground and the source of positive voltage.

The grid of the tube 1602 is connected to a left input terminal 1626 through a resistance 1628, a capacitance 1629 and a diode 1630. The grid of the tube 1602 is also connected to a suitable source of negative voltage through the resistance 1628 and resistances 1631 and 1632. A circuit including a switch 1634 is connected in parallel with the resistance 1632. The switch 1634 is normally closed to by-pass the resistance 1632. The grid of the tube 1602 is connected to the plate of the tube 1604 through the resistance 1628 and an R-C circuit including a resistance 1636 and a capacitance 1637.

The grid of the tube 1604 is connected to the input terminal 1626 through a resistance 1640, a capacitance 1641 and a diode 1642. The grid is also connected to the source of negative voltage through the resistance 1640 and a resistance 1643 and to the plate of the tube 1602 through the resistance 1640 and an R-C circuit including a resistance 1644 and a capacitance 1645.

The cathode of the tube 1602 is connected to the cathode of the tube 1604 and is connected to ground through resistances 1648, 1649 and 1650. The cathode of the tube 1604 is connected to ground through a capacitance 1652 and resistances 1653 and 1654. A neon bulb 1656 connects the plate of the tube 1602 to a terminal between the resistances 1653 and 1654 and a neon bulb 1558 connects the plate of the tube 1504 to a terminal between the resistances 1649 and 1650.

A pair of diodes 1660 and 1661 are connected in series between terminals of the diodes 1630 and 1642. A terminal 1662 is connected to a terminal between the diodes 1660 and 1661. Clock pulses similar to those introduced to the multivibrator 1500 in FIGURE 18 are also introduced to the multivibrator 1600 at the terminal 1662. The clock pulses are shown in waveform L in FIGURE 21.

The diode 1660 is connected to a diode 1664 through resistances 1665 and 1666. The resistances 1666 and 1665 are connected to a terminal of the resistance 1614. The diode 1664 is connected to the terminal between the resistances 1608 and 1614 and the diode 1660 is connected to the terminal between the resistances 1612 and 1616 through a diode 1668.

Prior to the application of power to the multivibrator 1600, the switch 1634 is opened. Upon the application of power to the multivibrator, the left tube 1602 becomes conductive and the right tube remains non-conductive because of the unbalance created by the resistance 1632. After the power has been applied, the switch 1634 is closed to by-pass the resistance 1632 and in this way the multivibrator 1600 becomes balanced so as to operate on a bistable multivibrator.

Initially, the left output terminal 1606 is low as shown in waveform N in FIGURE 21 and the right output terminal 1610 is high as shown in waveform O. The multivibrator 1600 will continue to operate in this condition until the left input terminal 1626 becomes high such as may occur when spindle pulses are introduced to the input as shown in waveform M in FIGURE 21. When the first spindle pulse 1670 is introduced to the input terminal 1626 to make it high, the condition of the multivibrator 1600 is changed at the next clock fall 1671 to cause the terminal 1606 to become high as shown at 1672 and the terminal 1610 to become low as shown at 1673. It will be noted that the change of condition also coincides with the fall 1674 of the spindle pulse 1670. This occurs because the spindle pulses are synchronized with the clock pulses by the spindle pulse synchronizer 539 in FIGURE 7 as will be subsequently disclosed.

The multivibrator 1600 will continue to operate in this condition until the introduction of the second spindle pulse 1675 which upon the next clockfall 1676 causes the terminal 1606 to become low as shown at 1677 and causes the terminal 1610 to return to its initial high state as shown at 1678. In this way, the multivibrator 1600 alternately changes its condition upon the successive introduction of spindle pulses to the terminal 1626.

Referring now to the multivibrator 234 in FIGURE 2, the waveforms of the outputs of the gates 226 and 236 can be readily understood. Initially the right output of the multivibrator 234 is high and introduces a high input to the gate 226. When the spindle pulse 1670 is introduced to the input of the multivibrator 234, the right input of the gate 226 becomes high because of its connection to the input of the multivibrator. Therefore, if the multivibrator 218 causes the left input of the gate 226 to be high then a pulse 1680 is produced at the output of the gate as shown in waveform P in FIGURE 21. It will be noted that the pulse 1680 coincides with the spindle pulse 1670. Upon the fall 1674 of the spindle pulse 1670, the left output of the multivibrator 234 becomes high and its right output becomes low.

Since the left output of the multivibrator 234 remains high during the application of the next spindle pulse 1675, a high input is introduced to the gate 236. At the same time a high input is also introduced to the other input of the gate 236 because of the application of the spindle pulse 1675. This causes a pulse 1682 to be produced at the output of the gate 236 as shown in waveform Q in FIGURE 21. It will be noted that the pulse 1682 coincides with the spindle pulse 1675.

In the manner disclosed above, the gate 226 produces at its output pulses which coincide with alternate spindle pulses introduced to the multivibrator 234 and the pulses produced at the output of the gate 236 coincide with the intermediate spindle pulses.

In order to set up the machine in FIGURE 7 for automatic operation, an operator is provided with information concerning the initial position of the tool 160 relative to the cam blank 132. For example, the operator may be provided with information that the tool should be initially positioned at point 1800 relative to the cam blank 132 as shown in FIGURE 24.

In addition, the operator is provided with information as to the number of passes the tool 160 must make over the cam blank 132 to cut a cam having the desired surface and with information as to the depth of the cut in each pass. For example, a total of 4 passes 1802, 1804, 1806 and 1808 are shown in FIGURE 24. The passes 1802, 1804 and 1806 represent course cuts, such as cuts of .060 inch and the cut 1808 represents a fine cut or a finish cut, such as a cut of .010 inch.

The operator mounts a cam blank 132 on the spindle 130 and positions the tool 160 at the point 1800. The operator also mounts the roll of tape 600 on the panel 604 as previously disclosed. If 4 passes are required, he manually sets the number of passes required control 585 at position 4 as illustrated in FIGURE 17. Then he manually sets the ganged switch 865 (FIGURE 11) for introducing high inputs to the gates 868, 878, 879 and 870. This provides information that the depth of the first three course cuts is to be .060 inch. Similarly, the ganged switch 866 (FIGURE 11) is manually set to introduce high inputs to the gates 882, 883 and 871. This provides information that the depth of the finish cut or the last cut is to be .010 inch.

The next step is to clear any information present in the temporary storage register 502 and the active storage register 507 and to feed in the information in the first and second blocks 660 and 662 on the tape 600. This is accomplished upon two successive closures of tape advance switches 547 and 568.

A first closure of the tape advance switch 547 introduces a high input to the gates 509, 513 and 512. The output produced at the gate 509 is introduced to the right inputs of the multivibrators 820, 830, 831, 832, 833, 834, 835, 837, 839 and 841 in the register 507. This clears any information that may have been present in these multivibrators. The output of the gate 513 is introduced to the right inputs of the multivibrators 809 and 811 for clearing these multivibrators and the output of the gate 512 is introduced to the right input of the multivibrator 818 to clear this multivibrator. In this way all of the information that may have been present in the register 507 is cleared.

Immediately after closure of the tape advance switch 547 the switch is opened and the tape advance switch 568 is closed. This introduces high inputs to the gates 576 and 566. The output produced at the gate 566 causes the left output of the multivibrator 562 to become high and to introduce a high input to the gate 503. The other input of the gate 503 is also high because of its connection to the right output of the multivibrator 508, which is normally high, through the gate 504.

The resultant output of the gate 503 is introduced to the gates 728, 730, 732, 734, 736, 738, 740, 742, 744, 746, 748, 750, 756, 752 and 754 in the register 502 (FIGURE 10). This causes an information that may have been present in the multivibrators in the register 502 to be transferred to corresponding multivibrators in the register 507. The output of the gate 503 is also introduced to the right inputs of the multivibrators in the register 502 to clear the information in the multivibrators.

As previously disclosed the closure of the tape advance switch 568 also introduces a high input to the gate 576. This causes the gate 576 to introduce a high input to the multivibrator 501 which in turn introduces a high input to the tape reader 500. When its input becomes high, the tape reader 500 advances the tape and reads the block of information which has been placed into the tape reader. The information in the first row in the block is introduced to the left inputs of the first bank of multivibrators in the register 502, namely, multivibrators 700, 704, 708, 712, 716, 720 and 724 and the information in the second row is introduced to the left inputs of the second bank of multivibrators in the register 502, namely, the multivibrators 702, 706, 710, 714, 718, 722 and 726. After this information has been introduced to the first and second banks of multivibrators in the register 502, the tape reader produces a high output for introduction to the right input of the multivibrator 501. This causes the right output of the multivibrator 501 to become high and the left output to become low and the tape reader stops its operation.

In the manner disclosed above, first successive closures of the tape advance switches 547 and 568 clears the information in the register 507, transfers the information in the register 502 to the register 507, clears the information in the register 502 and feeds the information in the first block 660 on the tape 600 to the register 502. Similarly, second successive closures of the switches 547 and 568 clears any information previously transferred to the active register 507 from the register 502, transfers the information in block 660 from the register 502 to the register 507, clears the information in the register 502 and feeds the information in the second block 662 to the register 502. The information in the first block 660 is now in the register 507 and the information in the second block 662 is in the register 502.

As previously disclosed, the information at position 7 in the second row of a block of information on the tape 600 represents the direction of spindle rotation. This information is placed into the multivibrator 814 (FIGURE 11) in the active register 507. The absence of a hole at position 7 may represent a positive spindle rotation with the spindle 130 rotating in the direction shown in FIGURE 1. A hole punched at this position may represent a negative spindle rotation or a rotation in the opposite direction. When there is no hole present at position 7, the right output of multivibrator 814 remains high and a high input is introduced to a grid of a tube in the spindle direction control 520. This produces a current flow through the tube and actuates a relay switch which causes the voltage output of the servo amplifier 524 to be of a polarity for rotating the spindle drive 525 and the spindle 130 in a positive direction. When there is a hole punched at position 7, the right output of the multivibrator 814 becomes low. Therefore, the relay in the direction control 520 remains unactuated and causes the voltage output of the servo amplifier 524 to be of a polarity for driving the spindle 130 in a negative direction.

The information at positions 5 and 6 in the second row of a block of information provided on the tape 600 will determine the speed of spindle rotation and will also determine the angle or "angular interval" through which the spindle will rotate while utilizing a block of information in the active register 507.

Where there are no holes at positions 5 and 6, the right outputs of the multivibrators 809 and 811 remain high for introduction to the decoder 836. This causes the decoder 836 to produce an output for introduction to the spindle speed control 523. The output of the decoder 836 is introduced to a grid of a particular tube in the direction control 523 and the resultant current flow through the tube closes a relay switch in a circuit for introducing a particular voltage to the servo amplifier 524 so that its output will rotate the spindle drive 525 at a particular speed.

When there are no holes at positions 5 and 6, the decoder also introduces an output to the gate 972 in the interpolator 521. This opens the gate 972 to pass the spindle pulses introduced to the gate and the resultant pulse output of the gate 923 is introduced to the following eight binary stages which together form a binary counter for counting the spindle pulses. Since there are eight binary stages, 255 pulses will be counted and the 256th pulse will return the counter to its zero condition. The 256th pulse will also produce an overflow pulse at the output of the gate 956. The overflow pulse will transfer the next block of information into the register 507 for utilization by the interpolator 521. Since 256 pulses are produced during a 5° rotation of the spindle, each block of information is utilized during a 5° angular interval. In this way the output of the decoder 836 determines the "angular interval" through which the spindle will rotate while utilizing each block of information.

When a hole is present at position 6 only, the right output of the multivibrator 809 remains high and the left output of the multivibrator 811 becomes high. This will cause the decoder 836 to produce an output for introduction to the grid of another tube in the speed control 523. When this occurs, another relay switch will be closed in a circuit for driving the spindle at another speed. The output of the decoder 836 will also open the gate 570 (FIGURE 12) to provide a count of 512 pulses before an overflow pulse occurs. Since 512 pulses are produced during a 10° rotation of the spindle, the spindle will rotate through a 10° angular interval for each block of information. Similarly, when a hole is present at position 5 only, the spindle will rotate through 20° angular intervals for each block of information and when a hole is present at both positions 5 and 6, the spindle will rotate through 89° angular intervals for each block of information.

Since a hole is present at position 6 only in the second row of each block of information on the tape 600 (FIGURE 9), the spindle will rotate through 10° angular intervals in synchronization with successive blocks of information on the tape.

After the operator has placed the information in blocks 660 and 662 into the registers 507 and 502, he turns on the hydraulic power to the spindle drive 525 and to the cross feed drive 536 and presses an automatic start button which causes the source 544 to produce a high output. Since a hole is present at position 6 in the second row of block 660, the left output of the multivibrator 811 (FIGURE 11) in the register 507 is high and the drive 525 and the spindle 130 are driven at a particular speed. The cross feed drive 536 will not rotate until an error voltage is produced at the output of the register 528 for introduction to the drive.

The rotation of the spindle drive 525 also produces a rotation of the spindle reading head 526 which has a carrier wave introduced to it from the demodulator 534. As the reading head 526 continues to rotate, a modulated voltage is produced at each output for introduction to the demodulator 534. The modulated voltages have envelopes which are displaced from each other and which are functions of spindle position. The voltages are demodulated by the demodulator 534 and two voltages which are proportional to the envelopes of the modulated voltages are produced at its outputs for introduction to the spindle pulse synchronizer 539. Waveforms R and S in FIGURE 22 represent the outputs of the demodulator when the drive 525 is rotating in a positive direction and waveforms R and S in FIGURE 23 represents the same outputs when the drive 525 is rotating in a negative direction. It will be noted that the waveform R leads the waveform S in FIGURE 22 and that the waveform R lags the waveform S in FIGURE 23.

The waveforms R and S are introduced to the left inputs of the Schmitt triggers 1000 and 1016, respectively, in FIGURE 13 and other outputs of the demodulator 534 introduce constant biasing voltages to the right inputs of the triggers 1000 and 1016. This causes voltages represented by the waveforms T and U to be produced at the left outputs of the triggers 1000 and 1016, respectively. When the spindle 130 is rotating in a positive direction, the circuitry in the spindle pulse synchronizer (FIGURE 13) operates to produce the pulses in waveform W (FIGURE 22) at the left output of the multivibrator 1020. The left output of the multivibrator 1028 remains low as shown by the waveform X in FIGURE 22. When the spindle is rotating in a negative direction, pulses are produced at the left output of the multivibrator 1028 as shown by the waveform X in FIGURE 23 and the left output of the multivibrator 1020 remains low as shown by the waveform W in FIGURE 23.

The pulses produced at the left outputs of the multivibrators 1020 and 1028 are the spindle pulses to which reference has been previously made. It will be noted that these pulses are produced in synchronization with the clock pulses shown in waveform V (FIGURES 22 and 23). For example, in FIGURE 22 the fall of the spindle pulse 1700 coincides with the fall of the clock pulse 1702 and in FIGURE 23 the fall of the spindle pulse 1710 coincides with the fall of clock pulse 1712. This is the reason for describing the block 539 (FIGURE 7) as a spindle pulse synchronizer.

Because of the operation of the reading head 526, a total of 18,432 spindle pulses are produced at the output of the synchronizer 539 for each revolution of the spindle 130 or a total of 512 spindle pulses for each 10° angular rotation of the spindle.

Since no hole is present at position 7 of the second row in the block 660, the right output of the multivibrator 814 (FIGURE 11) remains high and the spindle 130 is driven in a positive direction. This causes spindle pulses to be produced at the left output of the multivibrator 1020 (FIGURE 13) in the spindle pulse synchronizer 539. These spindle pulses are introduced to the gate 1100 (FIGURE 14) of the buffer register 519. Since the other input of the gate 1100 is low because of its connection to the output of the gate 542, which is normally low, the gate 1100 will remain closed. As a result, the gate 1118 remains closed and no spindle pulses are produced at its output for introduction to inputs of the gates 966, 968, 970 and 972 (FIGURE 12) of the interpolator 521.

When the spindle power is turned on, the spindle 130 begins to rotate at point 1800 (FIGURE 24) with respect to the cam 132. Since no spindle pulses are produced at the output of the buffer register 519 for introduction to the interpolator 521, no information is available to drive the tool 160 in a radial direction. However, the tool 160 will progress in an axial direction along the path 1810 because of the geared relationship between the servo 525 and lead screw 130. As previously disclosed, the tool will be fed .005 inch for each revolution of the spindle 130.

At a particular point in each revolution, the spindle operates to close the reference market switch 546 referred to in FIGURE 7. During the first revolution of the spindle, the switch 546 becomes closed at the reference mark position 1812. This causes a high input to be introduced to the gate 545.

Since the other input of the gate 545 is also high because of its connection to the source 544, the gate 545 produces a high output for introduction to the left input of the multivibrator 514. This causes the left output of the multivibrator 514 to become high for introduction to the gate 542, the other input of which is also high because of its connection to the source 544. The resultant high output of the gate 542 is introduced to the gates 1100 and 1110 (FIGURE 14) in the buffer register 519.

Since pulses are introduced to only the gate 1100 from the left output of the multivibrator 1020 in the spindle pulse synchronizer 539, the gate 1100 produces an output for introduction to inputs of the gates 1102 and 1104. Since the other input of the gate 1102 is also high because of its connection to the right output of the multivibrator 814, an output is produced at the gate 1102 for introduction to the gate 1106. The output of the gate 1106 is introduced to the gate 1118 and since the other inputs to the gate 1118 are connected to the right outputs of the multivibrators 1134, 1140 and 1142 which are normally high, tthe spindle pulses introduced to the gate 1100 are produced at the output of the gate 1118 for introduction to the gates 966, 968, 970 and 972 in the interpolator 521.

The buffer register 519 is used to insure that the number of spindle pulses that are transmitted to the interpolator 52 is truly proportional to the net motion of the spindle in the desired direction. When the spindle is rotating in a particular direction, something may occur in the operation of the machine to cause the spindle to back up. For example, if the spindle is moving in the positive direction and an excessive load is placed upon the spindle, the spindle may actually reverse its direction momentarily because of this load. When this occurs, the spindle will back up one or more spindle pulse positions. Once the load is overcome, the spindle will resume its rotation in the positive direction. If the spindle had backed up one pulse position, the spindle will again rotate through this position in a positive direction and will thus produce an extra spindle pulse. This will cause the spindle to introduce 513 pulses to the gate 1020 instead of 512 during that particular 10° interval of rotation. The buffer register 519 functions to prevent this extra pulse from getting to the interpolator 521.

When the spindle backs up one pulse position, a spindle pulse is produced at the left output of the multivibrator 1028 (FIGURE 13) as previously disclosed. This pulse is introduced to an input of the gate 1110, the other input of which is also high because of its connection to the output of the gate 542. The resultant high output of the gate 1110 is introduced to the gates 1112 and 1114. Since the other input of the gate 1114 is high because of its connection to the right output of the multivibrator 814, the gate 1114 is opened to introduce the spindle pulse to the gate 1108 which in turn introduces the pulse to the gates 1120 and 1130. The output produced at the gate 1120 is introduced to the multivibrator 1134 and causes its left output to become high. When the left output becomes high, the right input becomes low and no spindle pulse can be produced at the output of the gate 1118 for one spindle position when the spindle resumes its rotation in the positive direction. However, as soon as the spindle traverses one spindle position in the positive direction, an output is produced by the gate 1106 for introduction to the gate 1116. Since the other input of the gate 1116 is also high because of its connection to the gate 1136 which has a high input from the left output of the multivibrator 1134, the gate 1116 opens to introduce a high input to the gate 1120 which causes the multivibrator 1134 to return to its initial condition. When this occurs, the gate 1118 is opened so as to pass the second spindle pulse which is produced after the spindle has returned to its positive direction. The buffer register 519 thus operates to block the first spindle pulse so as to prevent the production of an excessive number of spindle pulses.

Actually the buffer register includes a three stage reversible binary counter. When the spindle backs up the register counts the pulses produced. When the spindle resumes rotation in the proper direction, enough pulses must be produced to cause the counter to count down to zero before any pulses will be produced at the output of the gate 1118.

If the spindle backs up for seven spindle pulse positions, the left outputs of the multivibrators 1134, 1140 and 1142 become high and the gate 1138 opens to introduce a high input to the multivibrator 1144 causing its left output to become high for introduction to the gate 535. The resultant output of the gate 535 operates to open an emergency relay control switch 541, thus shutting off the power to the spindle and cross feed drives. When the spindle backs up for seven or more pulse positions this is excessive and an indication that the machine is not operating properly. The machine tool is therefore automatically shut down in order to investigate the trouble.

In normal operation of the machine, the spindle pulses produced at the output of the gate 1118 are introduced to the gates 966, 968, 970 and 972 (FIGURE 12) in the interpolator 521. Since a hole is present at position 6 only of the second row of the blocks of information on the tape 600 (FIGURE 9), the decoder 836 will introduce a high input to only the gate 970 which will pass the spindle pulses. For each 10° interval of spindle rotation, 512 pulses are produced at the output of the gate 970. These pulses are successively divided by two (2) by the multivibrators 920, 926, 931, 935, 939, 943, 947, 951 and 955 to respectively provide potential command pulses of 256, 128, 64, 32, 16, 8, 4, 2 and 1 at the outputs of the gates 919, 925, 930, 934, 938, 942, 946, 950 and 954. In binary form the potential command pulse outputs of the gates are $2^8$, $2^7$, $2^6$, $2^5$, $2^4$, $2^3$, $2^2$, $2^1$ and $2^0$. Pulses will be produced at the outputs of the gates only when corresponding left outputs of the multivibrators in the register 507 (FIGURE 11) are high.

In block 660 on the tape 600 (FIGURE 9) a hole is present at position 8 of the second row. This represents "end of pass" information which causes the left output of the multivibrator 818 (FIGURE 11) to be high for introduction to the gate 515 (FIGURE 7). The other inputs of the gate 515 are also high because of their connection to the output of the gate 545 and to the arm 1429 in the pass counter 548 (FIGURE 17). The output of the gate 545 becomes high when the spindle crosses the reference mark 1812 and the output of the arm 1429 in the counter 548 remains high until the arm moves into the same position as the arm 1442 in the number of passes required control 585. Since all three inputs of the gate 515 become high when the spindle crosses the reference mark 1812, it introduces a high input to the gate 510 which in turn introduces a high input to the gates 860, 863, 870, 875, 878, 879 and 880 (FIGURE 11) in the active register 507. Since the ganged switch 865 has been previously set by the operator to introduce high inputs to the gates 868, 878 and 879, the resultant output of these gates are introduced to the gates 803, 810 and 813, respectively, which in turn introduce high inputs to the multivibrators 831, 837 and 839, thus causing their left outputs to become high.

The left outputs of the multivibrators 831, 837 and 839 are introduced to the inputs of the gates 919, 934 and 938 to open the gates for the introduction of $$2^8 + 2^5 + 2^4 = 300$$

command pulses to the gate 922 during the first 10° angular interval of spindle rotation after the spindle crosses the reference mark 1812. These command pulses pass through the gate 962 and are introduced to the gates 1236, 1238 and 1222 (FIGURE 15) of the cross feed synchronizer 522.

Since the gate 860 (FIGURE 11) is connected to the left output of the multivibrator 508 which is normally low, the gate 860 remains closed. Therefore, the inputs to the gate 800 and the left input of the multivibrator 820 remain low and the right output of the multivibrator introduces a high input to the gate 825 which has its other input high because of its connection to the source 544. The resultant high output of the gate 825 produces a high output at the gate 826 for introduction to the gates 1236 and 1250 (FIGURE 15) of the cross feed synchronizer 522. This causes all three inputs of the gate 1236 to be high because the command pulses are introduced to one input of the gate as perivously disclosed and the other input of the gate is connected to the right output of the multivibrator 1234 which is normally high. The resultant command pulse output of the gate 1236 is introduced to the gate 1224 which passes the command pulses to the gates 1300, 1304 and 1306 (FIGURE 16) of the error register 528.

The gate 1300 introduces the first command pulse to the gates 1307 and 1308. Since the right output of the multivibrator 1309 is normally high, the other input of the gate 1307 is high and the resultant output of the gate causes the left output of the multivibrator to become high. This causes a particular voltage to be produced at the output of the error register 528 for introduction to the cross feed amplifier 536. The voltage output will rotate the cross feed drive 537 and the lead screw 152 in a positive direction as shown in FIGURE 1.

When the right output of the multivibrator 820 is high as disclosed above, command pulses are produced at the output of the gate 1224 (FIGURE 15) for introduction to the gates 1300, 1304 and 1306 at the positive terminal of the error register 528 and this causes a voltage output for rotating the cross feed drive 537 in the positive direction. When the left output of the multivibrator 820 becomes high, the command pulses are produced at the output of the gate 1240 (FIGURE 15) for introduction to the gates 1300, 1302 and 1303 at the negative terminal of the error register 528 and this causes a voltage output for rotating the cross feed drive 537 in the negative direction.

Upon the introduction of the first command pulse to the error register 528, the drive 537 and the lead screw 152 start to rotate in a positive direction for causing the tool 160 to move in a radial or cross feed direction towards the axis of the cam 132. The tool 160 starts its cross feed movement at point 1814 when the spindle crosses the reference mark 1812.

The cross feed reading head 538 also begins to rotate upon rotation of the drive 537. The reading head 538, the demodulator 534 and the cross feed synchronizer 522 operate in the same manner as the reading head 526, the demodulator 534 and the spindle pulse synchronizer 539, to produce pulses at the left output of the multivibrator 1220 (FIGURE 15) or at the left output of the multivibrator 1234. When the servo 537 is rotating in a positive direction, pulses are produced at the left output of the multivibrator 1234 which are passed by the gate 1240 and are introduced to the gates 1300, 1302 and 1303 (FIGURE 16) at the negative terminal of the error register 528. These pulses are the <u>feed back pulses</u> to which reference has been previously made. The resulatnt output of the gate 1300 is introduced to an input of the gate 1308, the other input of which is also high because of its connection to the left output of the multivibrator 1309 which became high upon the introduction of the first command pulse. The resultant output of the gate 1308 causes the multivibrator 1309 to return to its initial condition with the right output high. This reduces he output of the error register 528 to zero and the servo 537 stops rotating until additional command pulses are fed to the register.

During the period that a feedback pulse is produced at the left output of a multivibrator 1234, the right output of the multivibrator becomes low. Therefore, the gate 1236 remains closed to prevent the passage of any command pulses during this period. This is necessary to prevent any coincidence between a command pulse and a cross feed pulse which would nullify the effect of the command pulse in producing a unit movement of the tool in a cross feed direction. If a command pulse is produced during this period, an output is produced at the gate 1238 because of its connection to the output of gate 962 (FIGURE 12) and to the left output of the multivibrator 1234. The output of the gate 1238 is passed by the gate 1246 and causes the left output of the multivibrator 1248 to become high at the end of the clock period in which the feedback pulse is produced. The left output of the multivibrator 1248 remains high for only one clock period because of its connection to the right input of the multivibrator through the gate 1254. This causes a high input to be introduced to the gate 1250, the other input of which is also high because of its connection to the output of the gate 826 (FIGURE 11). The resultant pulse output of the gate 1250 which lasts for one clock period is passed by the gate 1224 and is introduced to the error register 528 to serve as a command pulse. In this way the multivibrator 1248 operates to delay the production of a command pulse at the output of the gate 1224 so that it will not coincide with a feedback pulse produced at the output of the gate 1240.

The error register 528 which receives the command and feedback pulses is actually a reversible binary counter which counts in a positive direction the pulses received at its positive input and counts in a negative direction the pulses received at its negative input. The operation of a reversible binary counter is known to persons skilled in the art. The count in the register is at all times equal to the difference between the number of command and feedback pulses. The error register 528 is provided with circuitry to produce at its output a voltage which is proportional to the count in the register. The polarity of the voltage output would depend upon whether the count in the register is positive or negative. When the number of feedback pulses is equal to the number of command pulses, the count in the register is reduced to zero and the drive 537 stops rotating.

When the count in the register 528 becomes +112 all of the inputs to the gate 1353 become high and when the count becomes −113 all of the inputs to the gate 1354 become high. The resultant output of either the gate 1353 or 1354 will cause the left output of the multivibrator 1389 to become high. When this occurs, the gate 535 opens to operate the emergency relay control switch 541 to shut off the power to the spindle drive and the cross feed drive. When the count or error in the register becomes excessive, such as +112 or −113, this is an indication that the machine in not functioning properly and the trouble is corrected while the machine is shut down. In normal operation the right output of the multivibrator 1389 remains high for introduction to the gate 958 (FIGURE 12) to provide for an opening of the gate when its other input becomes high.

When the power to the spindle servo 524 is first turned on by the operator at point 1800, a high output is produced at the gate 516 (FIGURE 7) because each of its inputs are high. The inputs are connected to the right output of the multivibrator 553 which is initially high, the right output of the multivibrator 508 which is initially high, the arm 1429 which remains high until the arm moves into position 4, the source 544 which is always high during automatic operation of the machine and the left output of the multivibrator 818 which is high because of the hole punched at position 8 of the second row in the block 660 on the tape 600.

The high output of the gate 516 is introduced to the grid of the tube 1400 (FIGURE 17) in the pass counter control 552. This actuates the relay 1402 and closes the switch 1404. The resultant current flow through the positive solenoid 1414 causes the ganged stepping switch 1416 to advance to its number one position indicating the start of the first pass.

When the spindle crosses the reference mark 1812, the end of pass information in the multivibrator 818 is cleared. This occurs because the inputs to the gate 543 become high when the reference market switch 546 is closed and the output of the gate is passed by the gate 512 for introduction to the right input of the multivibrator 818.

As previously disclosed, 300 command pulses are produced at the output of the interpolator 521 during the first 10° angular interval of spindle rotation after the spindle crosses the reference mark 1812. Since each pulse represents a distance of .0002 inch movement of the tool 160 in a cross feed direction, the tool moves .060 inch from position 1814 (FIGURE 24) to position 1816 during the first 10° interval of spindle rotation. This distance represents the depth of the coarse cut to be made as manually set into the ganged switch 865.

When the last of the 512 spindle pulses which represent the first 10° angular interval is counted by the interpolator 521, an "overflow" pulse is produced at the output of the gate 956 (FIGURE 12) for introduction to the gates 529, 530, 532, 509, 505 and 531 in FIGURE 7. This opens the gate 509 to clear the information in the multivibrators 820, 830, 831, 832, 833, 834, 835, 837, 839 and 814 (FIGURE 11) of the register 507. The gate 530 is also opened because its other inputs are connected to the right output of the multivibrator 572 which is normally high and to the source 544 which is always high during automatic operation of the machine. The resultant output of the gate 530 is passed by the gate 513 to clear the information in the multivibrators 809 and 811.

The overflow pulse also opens the gate 529 which has its other input connected to the source 544 through the gate 570. The resultant output of the gate 529 is passed by the gate 566 to cause the left output of the multivibrator 562 to become high for introduction to the gate 503. Since the other input of the gate 503 is high because of its connection to the right output of the multivibrator 508 through the gate 504, an output is produced at the gate 503 for transferring the information in the register 502 to the register 507 and for clearing the information in the register 502. The overflow pulse also opens the gate 531 because of its connection to the source 544 and to the right output of the multivibrator 508. The resultant output of the gate 531 is passed by the gate 576 and causes the left output of the multivibrator 501 to become high. This actuates the tape reader 500 which advances the tape 600 so as to feed the information in the third block 664 to the register 502.

In the manner disclosed above, the overflow pulse clears the information in block 660 from the active register 507, transfers the information in the block 662 from the register 502 to the register 507, clears the information in the register 502, and feeds the information in the block 664 from the tape reader 500 to the register 502.

The numerical information in the block 662 causes the left outputs of the multivibrators 831, 833, 835, 837, 839, 841, 830, 832 and 834 to become high. This produces a particular number of command pulses for moving the tool 160 from the position 1816 to a position 1818 during the second 10° angular interval of spindle rotation and the overflow pulse which is produced at the end of the interval causes the information in the block 664 to be placed in the register 507 for controlling the movement of the spindle during the next 10° interval. In this way, successive blocks of information on the tape control the movement of the tool during successive 10° intervals of spindle rotation to make the first cutting pass 1802 from the position 1818 to the position 1820, which is beyond the end of the cam blank 132. For example, the information in blocks 664, 666 and 668 which corresponds to the information in rows 266, 268 and 270 in FIGURE 2 will control the tool movement during the third, fourth and fifth 10° intervals after the tool crosses the reference mark 1812.

From the position 1820, the tool moves under control of the tape to the point 1822 which is past a reference mark 1824. It will be noted that position 1822 is aligned with the position 1816 in that it is radially the same distance from the axis of the cam blank 132.

The information in the next block 670 on the tape 600 is provided with a hole at position 7 in the second row indicating a change in the spindle direction from positive to negative. When this information is transferred to the active register 507, high inputs are introduced to the left input of the multivibrator 814 (FIGURE 11) and to the gate 853. This causes the gate 853 to open because of its other connection to the right output of the multivibrator 814, which is high. The resultant output of the gate 853 is passed by the gate 852 and is introduced to the right input of the multivibrator 514 thus causing its right output to become high and its left output low. As a result, the gate 542 and the gate 1100 (FIGURE 14) in the buffer register 519 become closed. This in turn closes the gate 1118 to block the passage of spindle pulses to the interpolator 521. Because of this no further overflow pulses are produced and the tape reader 500 stops reading.

The high input to the multivibrator 814 causes its left output to become high and its right output to become low. As a result, the input to the spindle direction control 520 becomes low and the spindle begins to rotate in the opposite direction. Because the block 670 is provided with punched holes at positions 5 and 6 in the second row, the output of the decoder 836 introduced to the speed control 520 causes the spindle to be driven at a greater speed corresponding to 80° angular intervals for each block of information. As the spindle rotates in the opposite direction, it moves the tool back across the reference mark 1824. This closes the switch 546 which causes the gate 542 and the gate 1110 to become opened and spindle pulses are again produced at the output of the gate 1118 for introduction to the gate 966 (FIGURE 12) in the interpolator 521.

Since the other input of the gate 966 is also high because of its connection to the high output of the decoder 836, the spindle pulses are introduced to the multivibrators in the interpolator 521 and an overflow pulse is produced at the output of the gate 956 for each 80° angular interval of spindle rotation. The first such overflow pulse transfers to the register 507 the information in the next block 672 which is identical to the block 670 and this information maintains control of the spindle during its second 80° rotation after it crosses the reference mark 1824. In the same manner successive blocks which are identical to the blocks 670 and 672 maintain control of the spindle during successive 80° intervals of rotation and the tool travels along the path 1828. The tool passes through the position 1816 and continues past the reference mark 1812 to a position 1830.

At the position 1830, all of the information on the tape 600 has been utilized and the tape is advanced to its initial position with the information in block 660 being transferred to the register 507. Since no hole is present at position 7 of the second row, a high input is transferred to the right input of the multivibrator 814 (FIGURE 11) from the gate 756 (FIGURE 10). The output of the gate 756 is also introduced to the gate 850 which opens because of its connection to the left output of the multivibrator 814. The resultant output of the gate 850 is passed by the gate 852 and is introduced to the right input of the multivibrator 514. This causes the left output of the multivibrator to become low to close the gate 542 and the gate 1110 (FIGURE 14) for blocking the spindle pulse output of the gate 1118. At the same time, the spindle changes its direction of rotation and commences its second pass 1804 which is identical to the first pass 1802, except that the second pass 1804 is displaced from the first pass 1802 a radial distance of .060 inch closer to the cam blank 132 so as to provide for a second coarse cut of the cam. After the second pass is completed, the tool 160 starts its third pass 1806 which repeats the above disclosed cycle to provide a third coarse cut.

After the third pass 1806 has been completed, the tool starts its fourth and last pass 1808 at position 1832. As soon as the fourth pass is started, the stepping switch 1416 (FIGURE 17) in the pass counter moves from position 3 to position 4 because of the high output from the gate 516. When this occurs, the positions of the arms 1429 and 1430 correspond with the positions of the arms 1442 and 1440, respectively, in the number of passes required control 585. Since the arm 1429 becomes grounded its output becomes low and since the arm 1430 becomes connected to a source of voltage its output becomes high.

The low output of the arm 1429 causes the inputs of the gates 516, 515 and 549 to be low and the gates become closed. Therefore, when the spindle crosses the reference mark 1812 in the start of the fourth pass 1808, the output of the gate 515 and the gate 510 remain low and the coarse cut information is not transferred to the multivibrators in the register 507. Instead, the high output of the arm 1430 opens the gate 518, the output of which is then passed by the gate 511 and is introduced to the gates 861, 864, 871, 882, 883 and 884 in the register 507. Because of the previous manual setting of the switch 866, the outputs of the gates 882, 883 and 871 become high for passage by the gates 810, 813 and 803, respectively, and cause the left outputs of the multivibrators 837, 839 and 832 to become high. This information produces $2^5+2^4+2^1=50$ command pulses at the output of the interpolator 521 and the tool is fed in the radial direction a distance of .010 inch from the position 1834 to the position 1836 during the first 10° interval of spindle rotation after it crosses the reference mark 1812. This feed in distance of .010 inch provides for the finish cut on the surface of the cam during the pass 1808.

After the tool 160 has made its fourth pass 1808, the tool crosses the reference mark 1812. During the last 80° interval of spindle rotation, before the tool reaches a position 1840, the information in block 660 is in the register 502. Since a hole is present at position 8 of the second row of the block 660, the left output of the multivibrator 726 (FIGURE 10) in the register 502 is high and, therefore, the inputs to the gates 504, 505 and 506 are high.

When the overflow pulse for this last 80° interval occurs, the pulse clears the information in the active register 507 and is introduced to inputs of the gates 529 and 505. The gate 529 opens and causes the left output of the multivibrator 562 to become high. The gate 505 also opens because of its connection to the left output of the multivibrator 726 (FIGURE 10) and to the arm 1430 (FIGURE 17) which is in its number 4 position. The output of the gate 505 causes the left output of the multivibrator 508 to become high.

At the same time that the left output of the multivibrator 562 becomes high, the gate 506 opens because of its connections to the multivibrator, to the arm 1430 (FIGURE 17) in position 4, to the left output of the multivibrator 726 (FIGURE 10) and to the source 544. The resultant output of the gate 506 is passed by the gate 511 and is introduced to the gates 861, 864, 871, 874, 882, 883 and 884 (FIGURE 11) of the active register 507. This causes the gates 882, 883 and 871 to open because of their high inputs from the switch 866. The outputs of these gates cause the left outputs of the multivibrators 837, 839 and 832 to become high. The gate 861 also opens because of its connection to the high left output of the multivibrator 508 and causes the left output of the multivibrator 820 to become high.

The gate 550 is also opened because of its connections to the left output of the multivibrator 508 and to the arm 1427 (FIGURE 17) in its number 4 position. The output of the gate 550 causes the left output of the multivibrator 572 to become high for introduction through the gate 527 to the multivibrator 901 (FIGURE 12) and to the gate 902 in the interpolator 521.

When the input of the multivibrator 901 is high, its left and right outputs become alternately high upon successive falls of the clock pulses introduced to the multivibrator. Each time that its left output becomes high, the gate 902 opens and introduces a high input to the input of the multivibrator 904 and to the input of the gate 905. Upon the occurrence of 16,384 clock pulses, 8,192 pulses are produced at the output of the gate 905. In the same manner, each successive stage in the interpolator 521 produces at its output one-half the number of pulses introduced to it and potential command pulses representing the binary numbers $2^8, 2^7, 2^6, 2^5, 2^4, 2^3, 2^2, 2^1$ and $2^0$ are introduced to the gates 919, 925, 930, 934, 938, 942, 946, 950 and 954, respectively, each time the clock generates 16,384 pulses.

Since the left outputs of the multivibrators 837, 839 and 832 are high, the gates 934, 938 and 950 open to pass $2^5+2^4+2^1=50$ command pulses. Because of the change in the cross feed direction as indicated by the high left output of the multivibrator 820, these command pulses cause the servo 537 to be driven in a direction to back-up the tool 160 a distance of .010 inch from a position 1840 to the position 1832. This distance corresponds to the feed-in distance from the position 1834 to the position 1836.

The spindle actually stops rotating at position 1840 because an output produced at the gate 558 actuates the automatic stop relay control 560 which cuts off the power to the spindle. One input of the gate 558 becomes high because the left output of the multivibrator 508 acts through the gate 555 to make the left output of the multivibraor 533 high. The other input of the gate 558 is also high because of its connection to the left output of the multivibrator 818 which became high just after the overflow pulse for the last 80° interval occurred. As previously disclosed, the overflow pulse opened the gate 529 and caused the left output of the multivibrator 562 to become high. This in turn opened the gate 503 which had its other input high because of its connection through the gate 504 to the left output of the multivibrator 726 which was high because of the end of pass information in the block 660. The output of the gate 503 transferred the information in block 660 from the register 502 to the register 507 thus causing the left output of the multivibrator 818 to become high because of the hole present at position 8 in the second row of the block. The output of the gate 503 also clears the information of the register 502.

When the spindle power is cut off, the source 544 becomes low and the source 554 becomes high. This causes the gate 517 to open and the multivibrator 553 returns to its initial condition with the right output high.

At the same time that the tool 160 starts to back out at position 1840, the gate 533 is opened to introduce a high input to the grid of the tube 1406 (FIGURE 17). The gate 533 opens because of its connections to the high left output of the multivibrator 508, to the arm 1428 (FIGURE 17) in its position 4 and to the right output of the multivibrator 955 (FIGURE 12) which provides the potential command pulse ($2^0$). The resultant current flow through the tube 1406 causes a closure of the relay switch 1410 to energize the negative solenoid 1432 which moves the stepping switch 1416 from its number 4 position to its number 3 position. When this occurs, the output of the arm 1430 becomes low and the output of the arm 1429 becomes high.

When the overflow pulse occurs at the output of the gate 956 during the movement of the tool from position 1840 to position 1832, the information in the multivibrators 837, 839 and 832 (FIGURE 11) of the register 507 is cleared. The information in the multivibrator 818 remains because no output is produced by the gate 512 for introduction to the right input of the multivibrator. The overflow pulse also opens the gate 529 which has its other input connected to the high left output of the multivibrator 572 through the gate 570. The resultant output of the gate 529 causes the left output of the gate 562 to become high again for introduction to the gate 549. This causes the gate 549 to open because of its connections to the left output of the multivibrator 508 and to the arms 1428 and 1429 (FIGURE 17).

The output of the gate 549 is passed by the gate 510 and is introduced to the gates 860, 863, 870, 872, 875, 878, 879 and 880 (FIGURE 11) in the register 507. This causes the gates 870, 878 and 879 to open because of their high inputs from the switch 865 and the outputs of these gates cause the left outputs of the multivibrators 831, 837 and 839 to become high. Since the left output of the multivibrator 572 remains high and the interpolator 521 continues to count clock pulses, the gates 919, 934 and 938 open to provide $2^8+2^5+2^4=300$ command pulses. This causes the tool 160 to back out a distance of .060 inch from the position 1832 to a position 1842, which distance corresponds to the feed-in distance for each coarse cut. During this back out, the gate 533 is again opened to cause the pass counter 548 to count down to position 2.

In the same manner as disclosed above, the tool 160 backs out to the position 1830, and then to its initial starting position 1800 and the pass counter counts down to its zero position. When the counter reaches zero, the arm 1428 (FIGURE 17) becomes grounded and its input to the gate 550 becomes low. The final overflow pulse from the interpolator 521 then is introduced to the gate 532 which causes the multivibrator 572 to return to its initial position with its right output high. The multivibrator 508 also returns to its initial condition with its right output high because an output is produced at the gate 551. The overflow pulse causes the left output of the multivibrator 562 to become high for introduction to the gate 551 and the other input of the gate 551 is also high because of its connection to the arm 1427 (FIGURE 17) which is high only when it is in its zero position.

The machine disclosed above operates automatically to cut a three dimensional cam having a particular contour by making a required number of passes over a cam blank. Upon completing the required passes, the machine automatically returns to its initial starting position and stops. A second cam blank may then be mounted on the machine for cutting in accordance with the information on the first roll of tape or with different information on another roll of tape which the operator may substitute for the first roll.

The automatic cam machine disclosed above represents a major advance in the field of machine tools. It operates to cut three dimensional cams of any desired contour in accordance with recorded numerical information, such as may be provided on a tape. One embodiment of the machine which has been built cuts cam surfaces with an accuracy up to ±.001 inch.

The machine will cut an average three dimensional cam in one-half day as compared to the four month period required at present to prepare some cams because of the manual labor involved. The machine not only cuts cams with a greater accuracy and in a shorter period of time than has been possible, but it also eliminates the need for a considerable amount of high paid skilled labor. Since an operator is needed only to set up the machine, one man can easily maintain the operation of several machines.

It will be recognized by persons skilled in the art that the machine may be adapted to operate from recorded information in any suitable form and is not limited to the use of information punched on a tape. For example, punched cards and magnetic tape may also be conveniently used. Furthermore, the numerical information may be provided in other than the binary system, such as for example in the decimal system. Although it has been found convenient to use numerical information in coded form, such that a bit of information represents a particular number of command pulses, the digital information may also be provided in discrete form such that each bit of information represents one command pulse.

It will also be recognized by persons skilled in the art that recorded information such as may be provided on a single roll of tape may be used to control the operation of a plurality of machines to cut a plurality of similar cams at the same time.

Although this invention has been disclosed and illustrated with reference to a particular application, the principles involved are susceptible af numerous other applications which will be apparent to persons skilled in the art. The invention is, therefore, to be limited only as indicated by the scope of the appended claims.

We claim:
1. In a control system including shaft means and feed means having an actuator,
   pulse generator means operated by rotation of said shaft means for supplying pulses in timed relationship to the rotation of said shaft means,
   said feed actuator being operated by said pulse generator means at a speed synchronized with that of said shaft means.

2. In a control system as claimed in claim 1,
   wherein said pulse generator means includes a shaft speed generator and means operated by said shaft speed generator for supplying a pulse train for operating said feed actuator at a speed synchronized with that of said shaft means.

3. In a control system as claimed in claim 1,
   further including control means independent of said shaft speed generator for establishing a predetermined speed relationship between said shaft means and said feed means while maintaining synchronism therebetween.

4. In a control system including shaft means and a feed means having an actuator,
   shaft speed generator means directly operable by rotation of said shaft means,
   a sequential series of binary scaling elements with a common input from said shaft speed generator means and output means associated with each of said elements,
   and control means for said output means for selective operation thereof for establishing a predetermined speed relationship between said shaft means and said feed means while maintaining synchronization therebetween.

5. In a control system including rotatable shaft means and feed means having an actuator for effecting relative feed movement between said shaft means and said feed means responsive to an electrical input signal,
   electrical circuit means providing said input signal,
   including means selectively actuable to vary said input signal and pulse generator means responsive to rotation of said shaft means for supplying pulses in timed relation to the rotation of said shaft means to vary said input signal,
   whereby said input signal has a selectively variable component and a component dependent on rotation of said shaft means.

6. In a control system as claimed in claim 5,
   wherein said means responsive to rotation of said shaft means includes a shaft speed generator directly driven by said rotatable shaft means providing a pulse train output synchronized with the rotation of said shaft means.

7. In a control system as claimed in claim 6,
   wherein said means selectively actuable to vary said input signal includes means for selecting a portion only of said pulse train output and utilizing said portion as said input signal.

8. In a control system including rotatable shaft means and feed means having an actuator for effecting relative feed movement between said shaft means and said feed means responsive to an electrical input signal,
   including means selectively actuable to vary said input signal and pulse generator means for supplying pulses in timed relation to the rotation of said shaft means independent of said selectively actuable means to vary said input signal,
   whereby said input signal has a selectively variable component and a component independent thereof.

9. In a control system as claimed in claim 8,
   wherein said means independent of said selectively actuable means includes pulse generator means providing a pulse train output.

10. In a control system as claimed in claim 9,
    wherein said means selectively actuable to vary said input signal includes means for selecting a portion only of said pulse train output and utilizing said portion as said input signal.

11. A control system for controlling the movement of an object relative to a rotating member, the object being movable in an axial and in a radial direction relative to the member, including, means for moving the object in the axial direction a particular distance for each equal angular interval the member rotates, means coupled to the member for producing a particular number of first electrical pulses during a rotation of the member through each angular interval, means providing successive blocks of recorded numerical information, each block of information representing a required distance of movement of the object in the radial direction during the rotation of the member through a particular angular interval, means for receiving the first pulses produced during each interval of member rotation and responsive to the block of numerical information applicable to the interval for producing at its output, at substantially uniform intervals, a number of second electrical pulses representative of the numerical information and representing a multiple of the number of first pulses received, and means for receiving the last mentioned pulses and responsive to the pulses for moving the object in a radial direction, during the interval of member rotation, a distance proportional to the number of pulses received.

12. A control system for controlling the movement of an object along a first path relative to a rotating member, including, means for converting the rotation of the member into a plurality of electrical pulses, each pulse representing an incremental distance of movement of the object along the first path, an electrical circuit for receiving the pulses and for passing a particular number of the pulses in accordance with numerical data fed to the circuit, and means for receiving the pulses passed by the electrical circuit and for moving the object along the first path an incremental distance for each pulse received.

13. A control system for controlling the movement of an object relative to a rotating member, the object being movable in first and second directions relative to the member, including, means for driving the object in the first direction a particular distance for each equal angular interval of rotation of the member, a storage medium containing successive blocks of recorded numerical information in coded form, each block of information representing a required distance of movement of the object in the second direction during a rotation of the member through a particular angular interval, means coupled to the rotating member for producing a particular number of electrical first pulses during each angular interval of member rotation, an electrical circuit for receiving the first pulses produced during each particular angular interval and responsive to the block of digital information in the storage medium applicable to the interval to produce at its output electrical command pulses equal in number to the coded number and representing a multiple of the number of first pulses, an error register having first and second inputs for receiving electrical pulses and for producing at its output a voltage proportional to the difference between the number of pulses introduced to the inputs, the first input being connected to receive the command pulses, a servo connected to the output of the error register for moving the object in the second direction upon the application of a voltage to the servo, and means coupled to the servo to produce electrical feedback pulses upon the movement of the object in the second direction and connected to the second input of the register to introduce to the register a number of feedback pulses equal to the number of command pulses upon the movement of the object a distance proportional to the number of command pulses received by the register.

14. A control system for controlling the movement of an object relative to a rotating member, the object being movable relative to the member in an axial direction and in a radial direction, including, means coupled to the rotating member for moving the object in the axial direction a particular distance for each movement of the rotating member through an angular interval of a particular size, means coupled to the rotating member for producing a particular number of electrical pulses during each interval of member rotation, the pulses in each interval being produced upon successive movements of the member through a unit angular distance in the interval, means for counting the pulses produced during each interval to provide an indication of the position of the member in the interval in accordance with the count and for directing the pulses into separate channels, each channel carrying a lesser number of pulses by a definite ratio, a gate in each channel for passing the pulses upon an opening of the gate, means providing successive blocks of numerical information in recorded form, each block of numerical information representing a required distance of movement of the object in the radial direction during the rotation of the member through a corresponding interval, means for sensing the numerical information for each interval and for opening the gates in particular channels to pass a number of pulses representing the numerical information, and means for receiving the pulses passed by the gates and responsive to the pulses to move the object in the second direction a distance proportional to the number of pulses received during each interval.

15. A control system for controlling the movement of an object relative to a rotating member, the object being movable relative to the member in an axial direction and in a radial direction, including, means for moving the object in the axial direction a particular distance for each equal angular interval of rotation of the member, the object making a first pass over the entire surface of the rotating member upon a rotation of the member through a particular number of revolutions, a tape of looped configuration including successive blocks of recorded numerical information in coded form, each block representing a required distance of movement of the object in the radial direction during rotation of the member through a corresponding angular interval, means responsive to the blocks of information on the tape to move the object the required distance in the radial direction during successive angular intervals of rotation of the member, the information in all the blocks being utilized during the first pass of the object over the rotating member and the tape being returned to its initial starting position, and means operative upon completion of the first pass to return the object to its initial axial position relative to the rotating member to again utilize the information on the tape to make a second pass over the rotating member.

16. A control system for controlling the movement of an object, including, means for moving the object in a first direction, means coupled to the object for producing a particular number of first pulses for each unit distance movement of the object in the first direction, means providing successive blocks of numerical information in recorded form, each block representing a desired movement of the object in a second direction during a corresponding unit movement in the first direction, means responsive to the first pulses and to each block of information to produce at its output a number of second pulses corresponding to the information, the second pulses being synchronized with particular first pulses, and means responsive to the second pulses for moving the object in the second direction an incremental distance for each pulse received.

17. A control system for controlling the movement of an object, including, means for moving the object in a first direction, means for generating clock pulses, means coupled to the object and to the clock generating means for producing at its output a particular number of potential command pulses synchronized with the clock for each unit distance movement of the object in the first direction, means providing successive blocks of numerical information in recorded form, each block representing a desired movement of the object in a second direction during a corresponding unit movement in the first direction, means for receiving the potential command pulses and responsive to each block of numerical information to produce at its output a representative number of command pulses at substantially uniform space intervals during a corresponding unit movement of the object in the first direction, and means operative upon receipt of the command pulses to move the object in the second direction a distance proportional to the number of command pulses received.

18. In a system for controlling the movement of a first object relative to a second object, means for introducing recorded numerical information into the system representing a desired movement of the first object over the surface of the second object in a first pass, said means comprising an elongated tape-like medium of looped configuration for repeatedly introducing the same information into the system for successive passes of the first object over the surface of the second object, means for moving the first object in accordance with the numerical information over the surface of the second object in a first pass, and means operative upon completion of the first pass to return the first object to its initial position relative to the second object and to move the first object in accordance with the same numerical information over the surface of the second object in a second pass.

19. A system for controlling the movement of an object along a first axis relative to a rotating member, the movement of the object along the first axis being mechanically independent of the rotation of the member, said system including means coupled to the rotating member for converting its rotation into a particular number of first electrical pulses for each equal angular interval rotated by the member, means providing numerical information for each equal angular interval rotated by the member, means for receiving the first pulses produced during each interval of member rotation and responsive to the numerical information applicable to the interval to produce at its output a number of second electrical pulses, said number being a function of the numerical information and the number of first pulses received and means for receiving the second pulses and for moving the object along the first axis, during rotation of the member through the applicable angular interval, a distance proportional to the number of second pulses received.

20. A system for controlling the movement of a first object along a first path relative to a second object movable along a second path, the movement of the first object along the first path being mechanically independent of the movement of the second object, said system including means for moving the second object along the second path, means associated with the second object for producing a particular number of first electrical pulses for each movement of the second object through a particular distance along the second path, means providing numerical information for each movement of the second object through the particular distance along the second path, means for receiving the first pulses produced during each movement of the second object through the particular distance along the second path and responsive to the numerical information applicable to the distance moved by the second object to produce at its output a number of second electrical pulses, said number being a function of the numerical information and the number of first pulses received, and means for receiving the second pulses and for moving the first object along the first path, during movement of the second object through the applicable distance along the second path, a distance proportional to the number of second pulses received.

21. A control system, including a rotating member, an object movable along a first path relative to the rotating member, the movement of the object along the first path being mechanically independent of the rotation of the member, means associated with the rotating member for producing a plurality of electrical pulses at substantially uniform intervals during the rotation of the member, each pulse representing a particular distance of movement of the object along the first path, a gate for receiving the pulses and for passing a particular number of the pulses in accordance with numerical data fed to the gate, and means for moving the object the particular distance along the first path for each pulse passed by the gate and for continuously comparing the movement of the object to the number of pulses passed by the gate.

22. A control system, including a rotating member, an object movable along a first path relative to the rotating member, the movement of the object along the first path being mechanically independent of the rotation of the member, means coupled to the rotating member for producing a particular number of electrical pulses during rotation of the member through each angular interval of a particular size, means of counting the pulses produced during each interval to determine the position of the member in the interval in accordance with the count and for dividing the pulses into separate channels, each channel having a lesser number of pulses by a definite ratio, means for gating particular channels during each interval in accordance with numerical data, and means responsive to the pulse output of the gated channels to move the object along the first path relative to the rotating member during each angular interval a distance proportional to the number of pulses received.

23. A system for controlling the movement of an object along a first path relative to a rotating member, the movement of the object along the first path being mechanically independent of the rotation of the member, said system including means coupled to the rotating member for producing a first electrical pulse upon each rotation of the member through a particular angular interval, means providing numerical information, means for receiving the first pulses and responsive to the numerical information to produce at its output a number of second electrical pulses, said number being a function of the numerical information and the number of first pulses received, and means for receiving the second pulses and for moving the object along the first path a particular distance for each pulse received.

24. A system for controlling the movement of a first object along a first path relative to a second object movable along a second path, the movement of the first object along the first path being mechanically independent of movement of the second object, said system including means for moving the second object along the second path, means coupled to the second object for producing a first electrical pulse upon each movement of the second object through a particular interval, means providing numerical information, means for receiving the first pulses and responsive to the numerical information to produce at its output a number of second electrical pulses, said number being a function of the numerical information and the number of first pulses received, and means for receiving the second pulses and for moving the first object along the first path a particular distance for each pulse received.

References Cited by the Examiner

UNITED STATES PATENTS

| | | | |
|---|---|---|---|
| 2,365,365 | 12/1944 | Trinkle | 90—13.5 |
| 2,537,427 | 1/1951 | Seid | 318—28 |
| 2,736,852 | 2/1956 | Nelson | 90 |
| 2,741,732 | 4/1956 | Cunningham | 90 |
| 2,758,515 | 8/1956 | Smith | 90 |
| 2,784,359 | 3/1957 | Kamm | 318—28 |
| 2,792,545 | 5/1957 | Kamm | 318—28 |
| 2,860,294 | 11/1958 | Steele | 318—28 |
| 2,887,638 | 5/1959 | Cail et al. | 318—39 |
| 2,894,186 | 7/1959 | Cail et al. | 318—39 |
| 2,927,258 | 3/1960 | Lippel | 318—39 |

OTHER REFERENCES

Report: A Numerically Controlled Milling Machine, published by Servomechanisms Laboratory, Massachusetts Institute of Technology, 1951, 11 pages.

THOMAS B. HABECKER, *Acting Primary Examiner.*

WILLIAM W. DYER, M. O. HIRSHFIELD,
 O. L. RADER, STEPHEN W. CAPELLI, *Examiners.*

L. PEAR, T. LYNCH, H. L. HALPERT,
 L. A. HOFFMAN, P. XIARHOS, *Assistant Examiners.*